US011934969B2

(12) United States Patent
McNeil et al.

(10) Patent No.: US 11,934,969 B2
(45) Date of Patent: Mar. 19, 2024

(54) BIAS IDENTIFICATION IN COGNITIVE COMPUTING SYSTEMS

(71) Applicant: International Business Machines Corporation, Armonk, NY (US)

(72) Inventors: Kristin E. McNeil, Charlotte, NC (US); Robert C. Sizemore, Fuquay-Varina, NC (US); David B. Werts, Charlotte, NC (US); Sterling R. Smith, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 16/589,314

(22) Filed: Oct. 1, 2019

(65) Prior Publication Data

US 2021/0097405 A1    Apr. 1, 2021

(51) Int. Cl.
*G06N 5/04* (2023.01)
*G06F 18/214* (2023.01)
(Continued)

(52) U.S. Cl.
CPC ......... *G06N 5/041* (2013.01); *G06F 18/2148* (2023.01); *G06N 5/022* (2013.01);
(Continued)

(58) Field of Classification Search
CPC ........ G06N 5/022; G06N 20/00; G06N 5/025; G06N 5/04; G06N 5/041; G06N 5/045
See application file for complete search history.

(56) References Cited

U.S. PATENT DOCUMENTS 7,949,639 B2    5/2011 Hunt et al.
8,150,849 B2    4/2012 Chaudhury et al.
(Continued)

FOREIGN PATENT DOCUMENTS

WO    WO2017/149443 A1    9/2017

OTHER PUBLICATIONS

DeCook, "6.1: Statistical Significance", Sep. 28, 2016, University of Iowa, Retrieved from https://homepage.stat.uiowa.edu/~rdecook/stat1010/notes/Section_6.1_statistical_significance.pdf (Year: 2016).*
(Continued)

*Primary Examiner* — Ann J Lo
*Assistant Examiner* — Leonard A Sieger
(74) *Attorney, Agent, or Firm* — Stephen J. Walder, Jr.; Aaron Pontikos

(57) ABSTRACT

Mechanisms are provided to implement a bias identification engine that identifies bias in the operation of a trained cognitive computing system. A bias risk annotator is configured to identify a plurality of bias triggers in inputs and outputs of the trained cognitive computing system based on a bias risk trigger data structure that specifies terms or phrases that are associated with a bias. An annotated input and an annotated output of the trained cognitive computing system is received and processed by the bias risk annotator to determine if they comprise a portion of content that contains a bias trigger. In response to at least one of the annotated input or annotated output comprising a portion of content containing a bias trigger a notification is transmitted, to an administrator computing device, that specifies the presence of bias in the operation of the trained cognitive computing system.

21 Claims, 6 Drawing Sheets

(51) Int. Cl.
- G06N 5/022 (2023.01)
- G06N 5/025 (2023.01)
- G06N 5/045 (2023.01)
- G06N 20/00 (2019.01)

(52) U.S. Cl.
CPC ............... *G06N 5/025* (2013.01); *G06N 5/04* (2013.01); *G06N 5/045* (2013.01); *G06N 20/00* (2019.01)

(56) References Cited

U.S. PATENT DOCUMENTS

| | | | |
|---|---|---|---|
| 9,430,741 | B2 | 8/2016 | Baughman et al. |
| 9,526,421 | B2 | 12/2016 | Papadopoulos et al. |
| 10,304,003 | B2 | 5/2019 | Baughman et al. |
| 10,990,901 | B2* | 4/2021 | Deo ................ G06N 20/00 |
| 2008/0288889 | A1 | 11/2008 | Hunt et al. |
| 2008/0319829 | A1 | 12/2008 | Hunt et al. |
| 2011/0125734 | A1 | 5/2011 | Duboue et al. |
| 2014/0021365 | A1 | 1/2014 | Oda |
| 2015/0221088 | A1 | 8/2015 | Satish et al. |
| 2015/0310116 | A1* | 10/2015 | Fan ................ G06F 16/24578 707/731 |
| 2015/0338506 | A1 | 11/2015 | Yukumatsu |
| 2016/0224666 | A1* | 8/2016 | Horvitz ................ G06F 16/951 |
| 2016/0239740 | A1* | 8/2016 | Baughman ............... G06N 5/04 |
| 2017/0330058 | A1* | 11/2017 | Silberman ................ G06N 7/01 |
| 2018/0296102 | A1 | 10/2018 | Satish et al. |
| 2018/0341637 | A1* | 11/2018 | Gaur ..................... G06F 40/211 |
| 2019/0188605 | A1* | 6/2019 | Zavesky ................ G06N 20/00 |
| 2019/0195941 | A1 | 6/2019 | Winer et al. |
| 2020/0082299 | A1 | 3/2020 | Vasconcelos et al. |
| 2020/0160180 | A1* | 5/2020 | Lehr ........................ G06N 3/08 |
| 2020/0285999 | A1* | 9/2020 | McGovern ........... G06K 9/6215 |
| 2020/0372304 | A1* | 11/2020 | Kenthapadi ............... G06N 7/01 |
| 2020/0380398 | A1* | 12/2020 | Weider .................. G06F 16/285 |
| 2021/0049503 | A1* | 2/2021 | Nourian .............. G06F 11/3466 |
| 2021/0174222 | A1 | 6/2021 | Dodwell et al. |

OTHER PUBLICATIONS

Bolukbasi et al., "Man is to Computer Programmer as Woman is to Homemaker? Debiasing Word Embeddings", Jul. 21, 2016, arXivv 1607.06520v1, pp. 1-25 (Year: 2016).*

Jiang et al., "Identifying and Correcting Label Bias in Machine Learning", Jan. 15, 2019, arXiv, v 1901.04966v1, pp. 1-16 (Year: 2019 ).*

Angell et al., "Themis: Automatically Testing Software for Discrimination", 2018, ESEC/FSE 2018: Proceedings of the 2018 26th ACM Joint Meeting on European Software Engineering Conference and Symposium on the Foundations of Software Engineering, vol. 26 (2018), pp. 871-875 (Year: 2018).*

Adebayo, "FairML : ToolBox for diagnosing bias in predictive modeling", 2016, MIT, 2016, pp. 1-99 (Year: 2016).*

Herzig et al., "An Annotation Scheme for Automated Bias Detection in Wikipedia", 2011, Linguistic Annotation Workshop, vol. 2011, pp. 47-55 (Year: 2011).*

DeCook, "Statistically Significant", 2016, University of Iowa, retrieved from https://homepage.stat.uiowa.edu/~rdecook/stat1010/notes/Section_6.1_statistical_significance.pdf on Oct. 18, 2021 (Year: 2016).*

Angell et al. "Themis: Automatically Testing Software for Discrimination", 2018, Proceedings of the 2018 26th ACM Joint Meeting on European Software Engineering Conference and Symposium on the Foundations of Software, vol. 26 (2018), pp. 871-875 (Year: 2018).*

Adebayo, "FairML : ToolBox for diagnosing bias in predictive modeling", 2016 (Year: 2016).*

Zou et. al., "AI can be sexist and racist—it's time to make it fair", 2018, Nature, retrieved from https://www.nature.com/articles/d41586-018-05707-8 on Jan. 27, 2022 (Year: 2018).*

List of IBM Patents or Patent Applications Treated as Related, Jun. 25, 2020, 2 pages.

"AI Fairness 360 Open Source Toolkit", IBM Corporation, accessed online Jun. 1, 2020, 3 pages.

"Detecting and mitigating age bias on credit decisions", Project Jupyter, accessed online Jun. 1, 2020, 4 pages.

Ribeiro, Marco T. et al., ""Why Should I Trust You?" Explaining the Predictions of Any Classifier", Proceedings of the 22nd ACM SIGKDD International Conference on Knowledge Discovery and Data Mining, ACM 2016, arXiv:1602.04938v3 [cs.LG] Aug. 9, 2016, 10 pages.

Anonymous, "Cognitive Detector of Common Issues in IoT Devices (Hardware and Software)", IP.com, IP.com No. IPCOM000249187D, Feb. 9, 2017, 6 pages.

Anonymous, "System and Method for Locating Source of Bias", IP.com, IP.com No. IPCOM000255888D, Oct. 19, 2018, 6 pages.

Bosch, Nigel et al., "Accuracy vs. Availability Heuristic in Multimodal Affect Detection in the Wild", Proceedings of the 2015 ACM on International Conference on Multimodal Interaction (ICMI '15 ), Nov. 9-13, 2015, 9 pages.

Gehlbach, Hunter, "Meta-bias: A practical theory of motivated thinking", Education Psychology Review, Nov. 2018, 32 pages.

High, Rob, "The Era of Cognitive Systems: An Inside Look at IBM Watson and How it Works", IBM Corporation, Redbooks, Dec. 12, 2012, 16 pages.

Recasens, Marta et al., "Linguistic Models for Analyzing and Detecting Biased Language", Proceedings of the 51st Annual Meeting of the Association for Computational Linguistics, Aug. 4-9, 2013, 10 pages.

Yuan, Michael J., "Watson and Healthcare, How natural language processing and semantic search could revolutionize clinical decision support", IBM Corporation, developerWorks, http://www.ibm.com/developerworks/industry/library/ind-watson/, Apr. 12, 2011, 14 pages.

\* cited by examiner

What is the best toy for a girl?

Answers:

| | 220 | | 230 |
Doll 70% *
Puzzle 4%
Toy Pots and Pans 20% *
...
*This answer may be subject to gender bias

*FIG. 2B*

The training of the cognitive system may contain gender bias. The following operational parameters have been determined to be most influential in results that are believed to have gender bias:

Node ID: 2345    Weight ID: W075
Node ID: 5795    Weight ID: W123

240

The following portions of the corpus may contain gender bias:

Document ID: A45H63    Section ID: Background
                       Character Offset: 123
                       Span: 123, 156
...

BIAS IDENTIFICATION IN COGNITIVE COMPUTING SYSTEMS

BACKGROUND

The present application relates generally to an improved data processing apparatus and method and more specifically to mechanisms for identifying bias in the operation of cognitive computing systems.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system comprising a processor and memory, the memory comprising instructions executed by the processor to cause the processor to implement a bias identification engine that identifies bias in the operation of a trained cognitive computing system. The method comprises configuring a bias risk annotator of the bias identification engine to identify a plurality of bias triggers in inputs to the trained cognitive computing system and outputs of the trained cognitive computing system based on a bias risk trigger data structure that specifies terms or phrases that are associated with a bias. The method further comprises receiving, from the trained cognitive computing system, an annotated input to the trained cognitive computing system and an annotated output generated by the trained cognitive computing system, and processing, by the bias risk annotator, the annotated input and the annotated output to determine whether the annotated input or annotated output comprises a portion of content that contains a bias trigger in the plurality of bias triggers. Furthermore, the method comprises, in response to at least one of the annotated input or annotated output comprising a portion of content containing a bias trigger in the plurality of bias triggers, transmitting, by a bias notification engine of the bias identification engine, a notification to an administrator computing device, wherein the notification specifies the presence of bias in the operation of the trained cognitive computing system. In this way, the illustrative embodiment is able to determine if there is a potential bias in the training of a trained cognitive computing system and provide a notification to an administrator of the potential bias so that appropriate actions can be taken.

In some illustrative embodiments, in response to at least one of the annotated input or annotated output comprising a portion of content containing a bias trigger, a bias source identification engine of the bias identification engine tests the trained cognitive computing system using a bias test corpus and a set of bias test questions, and determines, based on results of the testing of the trained cognitive computing system, whether bias in the annotated output generated by the trained cognitive computing system is due to training of the trained cognitive computing system or due to bias present in the corpus used by the trained cognitive computing system. In this way, the illustrative embodiments are able to distinguish between bias being a result of the training of the trained cognitive computing system or as a result of bias present in the corpus of data upon which the trained cognitive computing system operates.

In some illustrative embodiments, the bias test corpus comprises a substantially even number of biased answers and non-biased answers to the set of bias test questions and testing the trained cognitive computing system using the bias test corpus and the set of bias test questions comprises processing, by the trained cognitive computing system, one or more bias test questions in the set of bias test questions based on the bias test corpus, and determining, by the bias source identification engine, for each of the one or more bias test questions, whether a biased answer or a non-biased answer from the bias test corpus is returned as an answer by the trained cognitive computing system. By utilizing a bias test corpus and bias test questions, it can be determined whether the training of the trained cognitive computing system is biased due to the trained operational parameters having been biased during the training, since if there is no bias in the trained operational parameters, the trained cognitive computing system should not surface biased answers at a statistically significant higher rate than non-biased answers.

In some illustrative embodiments, the bias source identification engine, determines that the source of bias in the annotated output of the trained cognitive computing system is training of the trained cognitive computing system in response to a statistically significant higher number of instances of biased answers in the bias test corpus being returned by the trained cognitive computing system than non-biased answers in the bias test corpus being returned by the trained cognitive computing system as answers to the one or more bias test questions. In some illustrative embodiments, the bias source identification engine determines that the source of bias in the annotated output of the trained cognitive computing system is the corpus used by the trained cognitive computing system in response to the number of instances of biased answers in the bias test corpus being returned by the trained cognitive computing system not being statistically significant over non-biased answers in the bias test corpus being returned by the trained cognitive computing system to the one or more bias test questions. Thus, in this way, by using a bias test corpus and corresponding bias test questions, a determination can be made as to the likely source of the bias being the training of the trained cognitive computing system.

In some illustrative embodiments, the notification specifies an identifier of a source of the bias as being one of the training of the trained cognitive computing system or the corpus used by the trained cognitive computing system, based on results of the determining operation. In this way, the administrator or other authorized personnel are given an indication of where investigations and/or modifications need to be focused in order to address any potential bias detected in the operation of the trained cognitive computing system.

In some illustrative embodiments, processing the annotated input and the annotated output to determine whether the annotated input or annotated output comprises a portion of content that contains a bias trigger in the plurality of bias triggers further comprises identifying annotated portions of the annotated input and the annotated output, analyzing corresponding contextual text surrounding the annotated portions to determine if the contextual text contains a bias trigger from the plurality of bias triggers, and adding a bias annotation to the annotated portions of the annotated input and the annotated output in response to corresponding contextual text surrounding the annotated portions containing a bias trigger from the plurality of bias triggers. In this way, the annotations that are potentially biased may be flagged or otherwise identified as potentially biased so that further investigations and modifications may be made to address such biases.

In some illustrative embodiments, the method further comprises tracking, by the bias identification engine, which operational parameters of the trained cognitive computing system contributed more highly than other operational parameters of the trained cognitive computing system, to annotated outputs of the trained cognitive computing system that are determined to have a bias trigger in the plurality of bias triggers. Moreover, the method further comprises maintaining, by the bias identification engine, for each operational parameter of the operational parameters, a count of instances of the operational parameter contributing more highly than other operational parameters to the annotated outputs. In addition, the method comprises determining, for each operational parameter of the operational parameters, whether or not the operational parameter is biased based on an associated count. In some illustrative embodiments, the notification comprises an indication of which operational parameters of the trained cognitive computing system are potentially biased based on results of determining, for each operational parameter, whether or not the operational parameter is biased based on the associated count. In this way, the illustrative embodiments may determine which operational parameters are most likely the driving factors to introducing bias into the operation of the trained cognitive computing system so that appropriate investigation and modification may be made with regard to these driving factors.

In some illustrative embodiments, the annotated input is a version of an input received by the trained cognitive computing system that has been annotated by one or more annotators of the trained cognitive computing system, and the output is a version of an output generated by the trained cognitive computing system that is annotated by the one or more annotators of the trained cognitive computing system. In such illustrative embodiments, the method further comprises modifying, by the bias identification engine, the output generated by the trained cognitive computing system to include an indicator that the output is potentially biased in response to results of the processing of the annotated input and the annotated output indicating that the annotated input or annotated output comprises a portion of content that contains a bias trigger in the plurality of bias triggers. Moreover, in such illustrative embodiments, the method also comprises returning, by the trained cognitive computing system, to a source computing system that submitted the input to the trained cognitive computing system, the modified output. In this way, end users that use the trained cognitive computing system to perform cognitive operations, such as question answering or the like, are given an indication that the results returned by the trained cognitive computing system may be biased. In this way, they may be able to include the possibility of bias in the results as an additional factor in their evaluation of the results returned by the trained cognitive computing system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 2B is an example diagram of results returned by a cognitive computing system in response to an input request in accordance with one illustrative embodiment;

FIG. 2C provides examples of notifications that may be sent regarding the existence and source of bias in the operation of a trained cognitive computing system in accordance with one illustrative embodiment;

DETAILED DESCRIPTION

Figure 1:
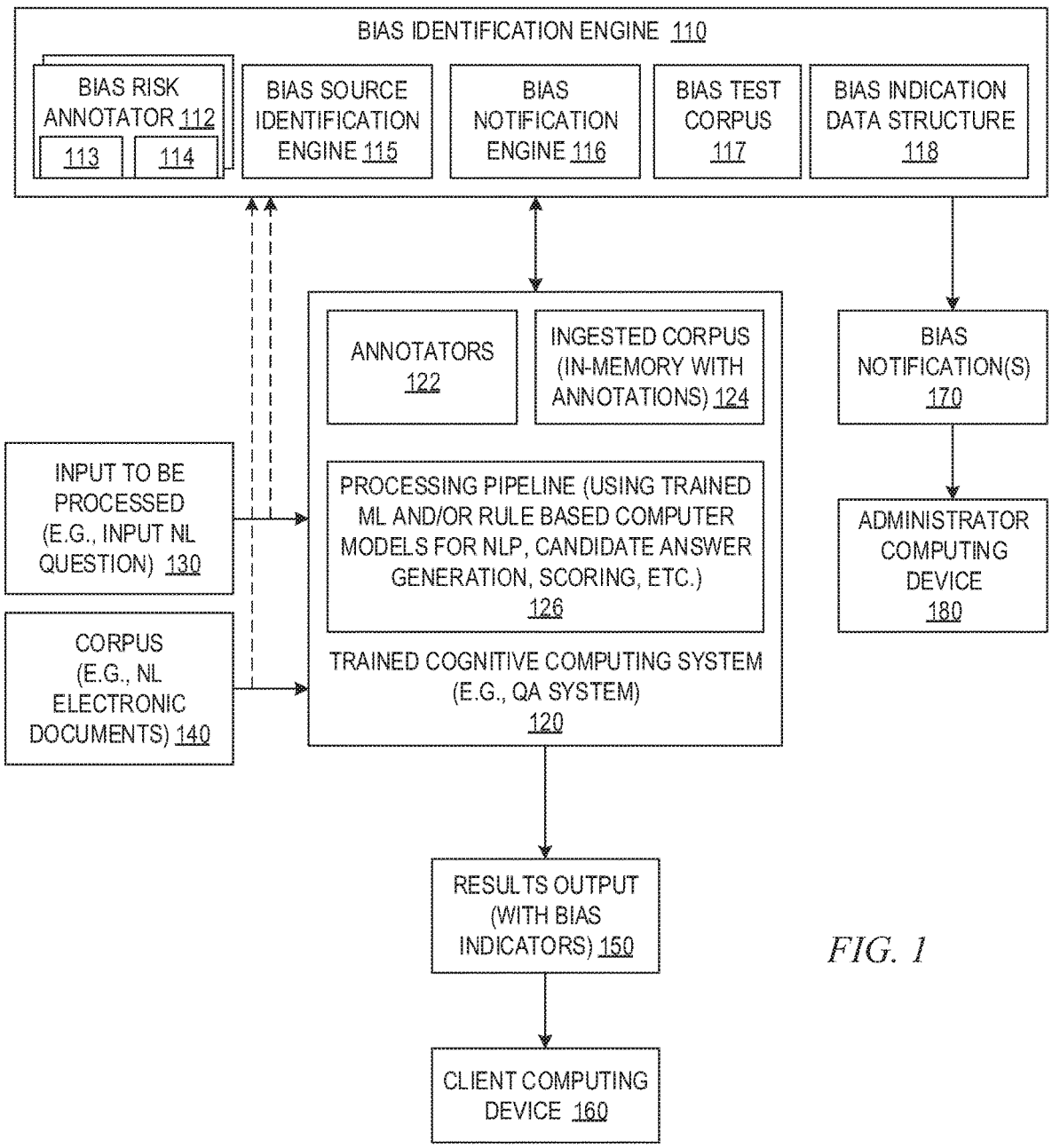
FIG. 1 is an example block diagram illustrating an overall operation of a bias identification engine in accordance with one illustrative embodiment.

The illustrative embodiments provide mechanisms for identifying bias in the operation of cognitive computing systems. It should be appreciated that references to identifying "bias" and elements being "biased," as these terms are used throughout the present description, refer to potential bias such that the invention identifies potential bias in the operation of a cognitive computing system and identifies potentially biased operational parameters or portions of a corpus/corpora used by the cognitive computing system. In other words, the mechanisms of the illustrative embodiments operate to identify situations in which the input/output of a cognitive computing system indicates the possibility that there is bias in the operation of the cognitive computing system and the source of this potential bias being either the training of the cognitive computing system or possible bias in the corpus or corpora being used by the trained cognitive computing system. The illustrative embodiments then send a notification or otherwise indicate the presence of the potential for bias in the operation of the cognitive computing system. The "potential" for bias may be verified as actual bias upon further evaluation, such as by a human subject matter expert, user, or the like.

The cognitive computing system may be any artificial intelligence based computing system that is trained through a machine learning process so as to generate results from given inputs, where the results have an acceptable level of error or loss after such training. For example, the cognitive computing system may be comprised of a single neural network, multiple neural networks, one or more rules based engines, a deep learning computing system such as the IBM Watson™ cognitive computing system, or the like. For purposes of illustration in the description of the illustrative embodiments hereafter, the cognitive computing system will be assumed to be the IBM Watson™ cognitive computing system, and in particular an implementation of the IBM Watson™ cognitive computing system as a question answering (QA) cognitive computing system.

The cognitive computing system is trained through a machine learning process that involves an iterative adjustment of operational parameters of the machine learning computer models employed by the cognitive computing system so as to minimize an error or loss in the outputs or results generated by the cognitive computing system. For example, in the case of a neural network, the weights of nodes in the neural network may be iteratively adjusted based on the input of training data and the comparison of outputs or results to expected outputs/results (ground truth) which indicates an error or loss. The iterative adjustment may be based on an identification of features that were most influential in the generation of the output such that the weights associated with nodes processing such features may be adjusted to minimize the influence of those features on the output and thus, reduce the loss or error in the output generated. This machine learning process is referred to as training the machine learning computer model or training the cognitive computing system.

Through the training of a cognitive computing system, bias may be inadvertently introduced into the operation of the cognitive computing system due to such bias being present in training datasets. For example, in the case of gender bias, training datasets may associate with females or males, traditional or stereotypical associations of characteristics, objects, events, etc. which reflect a bias (whether it be a positive or negative bias), e.g., likes, dislikes, limitations, strengths, etc. For example, a bias may be that females prefer the color "pink" and males do not prefer the color "pink" or that female children like to play with "dolls" and male children do not like to play with dolls. Such bias may be present in the training datasets in various ways, e.g., a relative number of training data instances having correct results being "pink" or "dolls" for corresponding features of "female" being substantially greater than other possible results. Once such biased training data is used to train a cognitive computing system, it is very difficult to identify the bias in the operation of the cognitive computing system.

The problem with bias embedded into cognitive computing systems, or trained computer models employed by these cognitive computing systems, is that the results generated by these systems/models may be incorrect. The majority of the time, the output of a trained cognitive computing system or trained computer model is processed through additional computer logic within a calling application. Depending on the calling application, various incorrect outcomes could result. For example, trained cognitive computing systems or trained computer models with bias "trained in" or embedded in the cognitive computing system and/or computer models could possibly cause unfair/unfavorable financial decisions, unfair/unfavorable decisions about the incarcerated, unfair/unfavorable decisions about educational needs and projects, etc. Practically any current system in use today that utilizes the operation of a trained cognitive computing system and/or trained computer model component has a possibility of bias being "trained in" and used indirectly to make decisions based on these biases. The entities using such biased cognitive computing systems and/or computer models, e.g., companies, governmental agencies, or other individuals or organizations, may experience legal or public dissatisfaction issues.

The illustrative embodiments provide mechanisms for identifying bias in the operation of a cognitive computing system, e.g., gender bias. While gender bias will be used as a primary example throughout the following description, it should be appreciated that the mechanisms of the illustrative embodiments may be implemented to identify any type of bias that may be present in the operation of the cognitive computing system, such as bias for/against particular parties, organizations, objects, etc. for various reasons, e.g., bias toward/against a particular political party, a particular special interest group, etc. Moreover, the bias that is identifiable may be either positive or negative bias, as the mechanisms are configured to identify bias itself. Whether or not the bias is "negative" or "positive" is a human judgement and is not relevant to the operation of the mechanisms of the illustrative embodiment. In some cases, the bias may be a positive aspect of the operation of the cognitive computing system and while it may be identified by the mechanisms of the illustrative embodiment, it may not be identified such that it can be removed but rather to merely provide further information as to the reasoning behind the results generated by the cognitive computing system.

The mechanisms of the illustrative embodiments operate on an already trained cognitive computing system which may or may not have a configuration, due to the training of the cognitive computing system, which introduces a bias into the results generated by the trained cognitive computing system. It should be appreciated that when reference is made to the trained cognitive computing system herein, such references may also be considered directed to a trained computer model in some illustrative embodiments. That is, a trained cognitive computing system may use one or more trained computer models to perform cognitive computing operations, however the mechanisms of the claimed invention may also be applied to a single trained computer model as well. Thus, the description of mechanisms of the illustrative embodiments with references to a trained cognitive computing system may also be applied to individual trained computer models as well.

The mechanisms of the illustrative embodiments provide a bias risk annotator that operates to evaluate the input to the trained cognitive computing system and the output of the trained cognitive computing system to determine whether there is bias in the operation of the trained cognitive computing system. A knowledge base that specific indicators of particular types of bias, e.g., gender bias, is used in some illustrative embodiments to determine whether the cognitive computing system itself is biasing the results generated. For example, in the case of a trained question answering (QA) cognitive computing system, the input question may be analyzed by the bias risk annotator to determine if the input question specifies a concept that may expose a bias in the cognitive computing system, e.g., the input question specifies a gender in the case of a gender bias evaluation. The results generated by the cognitive computing system may be evaluated against the knowledge base to determine if the results have indicators of potential bias in the cognitive computing system, e.g., the input question asks about a best toy for a girl (may expose a gender bias) and the answer generated indicates a "pink" item, a "dollhouse", a "doll", or the like (indicative of a potential gender bias in the context of the question asked).

The bias risk annotator, based on the evaluation of the input and the output of the trained cognitive computing system, may annotate, flag, or otherwise indicate portions of the input, the output, or even evidential natural language content used to support the results in the output, as having a bias. For example, when a QA cognitive computing system operates on an input question, the QA cognitive system uses an annotated in-memory representation of structured and/or unstructured electronic documents from one or more corpora as a basis for generating a result, or answer, for the input question, as will be discussed hereafter. With the risk bias annotator of the present illustrative embodiments, the context surrounding the annotated portions of the in-memory representations may be evaluated using the knowledge base to determine if there is a bias associated with these annotated portions and such bias may then be annotated or flagged in the in-memory representation of the electronic document such that any results generated using these annotated portions of the electronic document as a basis may likewise be annotated or flagged as potentially biased.

Once bias in the input or the output is identified by the bias risk annotator, additional analysis may be performed regarding the electronic corpus to determine whether the results were driven by the corpus or driven by the cognitive computing system training. In some cases, a test corpus may be utilized that has a known substantially even number of bias answers and non-biased answers in it so that it can be determined which answers are surfaced by the trained cognitive computing system such that bias in the operation of the cognitive computing system training may be identified.

Thus, by identifying bias indicators in the input and bias indicators in the output, the possibility of bias in the operation of the trained cognitive computing system may be identified and then this possibility of bias may be tested to determine if the bias is in the trained cognitive computing system itself, or potentially in the corpus or corpora being used by the trained cognitive computing system. For example, if the testing of the trained cognitive computing system indicates that the trained cognitive computing system surfaces the biased answers in the evenly distributed biased/non-biased answers in the test corpus at a statistically significant higher amount, e.g., equal to or greater than a threshold amount (e.g., 60% more times than non-biased answers), then it is more likely than not that the trained cognitive computing system contains biased operational parameters. If the testing does not show the trained cognitive computing system surfacing biased answers more than non-biased answers by a statistically significant amount, then the bias in the results generated by the trained cognitive computing system is more likely due to bias in the corpus or corpora content itself.

In some illustrative embodiments, the operational parameters which contributed most to the results generated by the trained cognitive computing system may be identified, in a similar manner as is done during the training of the cognitive computing system using a machine learning process. For example, similar to the way in which the most influential operational parameters, e.g., weights, of a computer model are tracked during machine learning processes to train a computer model, such as a neural network model, the operational parameters that contributed most to the results determined by the illustrative embodiments to be biased may be tracked. In embodiments where the cognitive computing system and/or computer model utilizes a rules engine based on a set of predefined rules and dictionary data structures, the illustrative embodiments may identify and return an identifier of the dictionary data structure used by the trained cognitive computing system and/or trained computer model where matched biased concepts are located and/or return an identifier of the particular rule in the predefined rules that resulted in the bias finding.

The identified operational parameters may then be flagged or otherwise marked, such as in a bias indication data structure, as potentially biased for later examination and/or retraining. In some illustrative embodiments, this may be done for multiple inputs to see which operational parameters are most influential and determine how often the same operational parameters appear in the most influential operational parameters for biased answers, e.g., a separate counter or count of the number of times may be stored in the bias indication data structure for each operational parameter. This count of occurrences of the operational parameters in the bias indication data structure may then be compared to one or more threshold values to determine if the number of occurrences indicate bias in the training of the operational parameter, e.g., if the count is equal to or greater than a threshold value in the one or more threshold values, or not.

Once bias is determined to exist in the operation of the trained cognitive computing system or the corpus/corpora, the bias may be logged in a log data structure and/or a notification may be sent to an administrator or other authorized personnel, through their computing system, to inform them of the bias so that appropriate corrective actions may be performed. The notification may comprise, in some illustrative embodiments, an indication of which operational parameters of the trained cognitive computing system contributed most to the biased results generated by the trained cognitive computing system, which may be determined based on the comparison of the counts in the bias indication data structure to the one or more thresholds. The notification may comprise a list of annotations in the results generated by the trained cognitive computing system that contain a bias risk as identified by the bias risk annotator. The notification may specify bias risk indicators over annotations, bias risk indicators over feature types, and/or bias risk indicators over feature values, for example. With regard to bias found to be present in the trained cognitive computing system, the notification may initiate a retraining of the cognitive computing system, for example.

If the bias is determined to not be due to the training of the trained cognitive computing system, then the notification may indicate that there is bias in the corpus/corpora that is affecting the operation of the trained cognitive computing system. This will allow the administrator or other authorized personnel to contact providers of the corpus/corpora to determine how to address the bias, or may cause the administrator or other authorized personnel to select a different corpus/corpora to use as a basis for the operation of the trained cognitive computing system, for example. In some cases, modifications to the corpus/corpora may be made to reduce bias in the corpus/corpora.

In some illustrative embodiments, when the results of the trained cognitive computing system are returned to a requestor via their computing device, the results may be flagged or otherwise indicated as potentially being biased, and that flag or indicator is presented to the requestor along with the results. It should be appreciated that in some illustrative embodiments, the cognitive computing system may return a listing of potential correct results to the requestor and thus, some of these may be flagged as biased while others may not be flagged as biased in the returned results.

While the above description assumes that the bias risk annotator is executed on the input to the trained cognitive computing system and the results in the output generated by the trained cognitive computing system, the illustrative embodiments are not limited to such. To the contrary, the bias risk annotator may be applied to any portion of textual content in which bias may exist. For example, as part of the operation of a cognitive computing system, the corpus or corpora that the cognitive computing system uses to generate results are ingested into an in-memory representation of the content. As part of this ingestion, portions of the text are annotated by annotators to identify various portions of speech useful in generating results, e.g., identification of proper names, particular entities such as persons, places, things, negative terms/phrases, hypothetical terms/phrases, medical codes, medical terms/phrases, etc. The bias risk annotator may execute as another one of these annotators that indicates the potential risk of bias in a portion of text based on the presence of a bias risk trigger in the contextual text surrounding annotations found by one or more of the other annotators. For example, particular entity annotations may be used as a basis upon which to perform annotation of the context surround the entity annotations to determine if bias triggers are present, e.g., for a gender bias implementation, entities representing people may be used as a basis for analyzing the textual context surrounding the entities to determine if a bias trigger is present.

In this way, the in-memory representation of the content of the corpus/corpora is annotated for potential bias. In some cases, if a bias trigger is present, a portion of the content is determined to be potentially biased, which may be different depending on the particular bias trigger found. The corresponding portion of the content is then annotated as potentially containing bias. This bias annotation may then be used to automatically associated with any results generated by the trained cognitive computing system, which rely on the portion of the content for the result that is generated, to be flagged or otherwise indicated as potentially biased, e.g., if the answer to an input question is found in the portion of content, then that answer may be flagged as potentially biased. This flagging of the result as potentially biased may be used as a trigger to trigger the bias risk annotator to operate on the corresponding results as previously described above to determine if the results themselves contain a potential bias in the content of those results. If both the flagging indicates bias and bias is found to potentially exist in the results output itself, then the notifications and responsive operations described previously may be performed, including testing the trained cognitive computing system to determine if the bias exists in the training of the cognitive computing system or in the corpus/corpora. In this case, however, the flagging of the results based on the results being generated based on a potentially biased portion of content in the corpus/corpora is already known to exist. However, bias may also exist in the training of the cognitive computing system and thus, the test may be performed to determine if the training is biased as well.

Moreover, as noted previously, one responsive action that may be taken in response to a notification that bias may exist in the corpus/corpora, is to modify the corpus/corpora to reduce the amount of bias present. In this illustrative embodiment, through annotation of the corpus/corpora using the bias risk annotator, it is known which portions of content in the corpus/corpora contain potential bias which influences certain results generated by the trained cognitive computing system. As a result, it is known which portions of content may be removed from the corpus/corpora or otherwise modified in order to reduce bias in the corpus/corpora. Thus, these portions of content may be identified in the notification to the authorized personnel such that they may then perform operations to modify the corpus/corpora with specific attention to the identified portions of content, so as to remove or reduce the bias present in the corpus/corpora.

Thus, with the mechanisms of the illustrative embodiments, bias in the training of the cognitive computing system and/or the corpus/corpora used by the trained cognitive computing system may be identified. By identifying this bias being present, appropriate notifications may be sent to authorized personnel to inform them of the bias and initiate corrective actions to reduce the influence of bias in the operation of the trained cognitive computing system, when appropriate, such as by retraining the cognitive computing system, selecting a different corpus/corpora as a basis, or even modifying the corpus/corpora to reduce bias in the corpus/corpora. In this way, if desired, bias in the results generated by trained cognitive computing systems may be reduced resulting in better results being generated by the trained cognitive computing system. Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides mechanisms for identifying bias in the operation of a trained cognitive computing system or in the content of a corpus/corpora upon which the trained cognitive computing system operates. With these mechanisms, given a trained cognitive computing system one or more inputs to be processed, and a one or more corpora of electronic content upon which to operate, the trained cognitive computing system processes the inputs based on the one or more corpora and generates results. A bias risk annotator operates on the inputs and results output to determine the potential for bias in the operation of the trained cognitive system. Moreover, ingested electronic content, e.g., ingested corpus 124, from the one or more corpora may be processed by the bias risk annotator to determine potential bias in the electronic content as well. Portions of the input 130 to the trained cognitive computing system, the results output 150 generated by the trained cognitive computing system, and/or the ingested corpus/corpora 124 may be annotated as potentially containing bias and such annotations may be returned along with the results to the input provider. Also, further analysis and evaluation may be performed to determine if the source of the bias in the results is from the training of the trained cognitive computing system or in the corpus/corpora used by the trained cognitive computing system, or both. Appropriate notifications, retraining, modification of the corpus/corpora, and the like may then be initiated so as to minimize the influence of negative bias (unwanted bias) or even introduce positive bias (wanted bias), depending on the particular implementation.

FIG. 1 is an example block diagram illustrating an overall operation of a bias identification engine in accordance with one illustrative embodiment. For purpose of the following description, it is assumed that the cognitive computing system is a question answering (QA) cognitive computing system, such as may be provided by the IBM Watson™ cognitive computing system available from International Business Machines (IBM) Corporation of Armonk, N.Y. It is further assumed that the cognitive computing system has been trained through a machine learning process such that the mechanisms of the illustrative embodiments are used to identify whether this training of the cognitive computing system has introduced bias into the cognitive computing system itself or, if there is bias, if the bias is instead a result of the corpus/corpora upon which the trained cognitive computing system operates.

In FIG. 1 it is assumed for purposes of illustration that the bias identification engine 110 is a separate entity from the trained cognitive computing system 120. However, it should be appreciated that some, or even all, of the elements of the bias identification engine 110 may be integrated into the trained cognitive computing system, depending on the desired implementation, without departing from the spirit and scope of the present invention. For example, the bias risk annotator 112 may be provided as an additional annotator in the trained cognitive computing system 120, e.g., as part of annotators 122. Moreover, the bias notification engine 116 may be integrated into one or more of the output stages of the processing pipeline which operate to return candidate and/or final results to a client computing device. Many modifications to the depicted arrangement of elements may be made according to a desired implementation without departing from the spirit and scope of the present invention.

As shown in FIG. 1, the bias identification engine 110 comprises one or more bias risk annotators 112 with corresponding bias risk trigger data structures 113 and bias risk dictionary data structures 114. Each of the one or more bias risk annotators 112 comprises a bias risk model that is comprised of a plurality of rules data structures specifying patterns of content elements indicative of a bias which may be present in content being evaluated by the bias identification engine 110. For example, a bias risk model may include a rule data structure of the type "<Bias Trigger><Bias Noun Category>", where the <Bias Trigger> is a term/phrase matching a Bias Trigger term/phrase in a corresponding Bias Trigger data structure 113, and <Bias Noun Category> is a term/phrase matching a Bias Noun Category term/phrase in a corresponding dictionary data structure 114.

Each of the bias risk trigger data structures 113 and bias risk dictionary data structures 114 may comprise various different data structures for the particular types of bias risk triggers and/or dictionaries employed by the corresponding bias risk annotator 112. For example, for a bias risk annotator 112 operating to identify potential gender bias, the bias risk trigger data structures 113 may comprise one or more data structures specifying terms/phrases that may be associated with a gender bias and thus, may trigger evaluation of other contextual elements as to whether they match a corresponding rule of the bias risk model, e.g., the terms "girl", "woman," "women", "female", "boy", "man", "men", "male" etc. may all be gender bias triggers such that the context surrounding these terms is evaluated to determine if the context indicates gender bias in the text.

The bias risk dictionary data structures 114 specify the terms/phrases that may be used as elements of the patterns specified in the rules of the bias risk model. For example, in a gender bias annotator implementation, the gender bias risk annotator 112 may have a gender bias risk model that specifies rules in terms of Gender Bias Triggers, Actions, and Bias Nouns. The gender bias risk annotator 112 may have a set of Gender Bias Triggers specified in the bias risk trigger data structures 113 and a plurality of dictionary data structures 114 comprising a first dictionary data structure for Action terms/phrases that are indicative of gender bias, i.e. an Action Dictionary, and a second dictionary data structure for Bias Noun Categories, i.e. a Bias Noun Category Dictionary.

The following are examples of the gender bias rules of a gender bias risk model of a gender bias risk annotator, Gender Bias Triggers 113 and Action Dictionary and Bias Noun Category Dictionary that may be part of the dictionary data structures 114, for one illustrative embodiment:

Example Rules for Gender Bias Risk Model:
<Gender Trigger><Action>
<Action><Gender Trigger>
<Gender Trigger><Bias Noun>
<Bias Noun><Gender Trigger>
Example Gender Triggers:
girl
woman
women
female
boy
man
men
male
Example Action Dictionary:
throws like a
runs like a
cannot
are not as
Example Bias Noun Category Dictionary (Part of Parts of Speech):
color
toy With the defined bias risk rules of the bias risk model, instances of a bias trigger found in the content being evaluated may be used as a basis for attempting to match the bias trigger and the contextual text surrounding the bias trigger to one or more of the patterns specified in one or more of the bias risk rules. If there is a match, then a corresponding bias risk annotation is generated and added to the metadata of the content in association with the portion of content. For example, the following are examples of textual content that matches one or more of the rules specified in the example above based on the bias triggers and dictionaries provided in the bias risk annotator:

Runs like a girl.
Runs like a boy.
Throws like a girl.
Pink is a girl color.
Girls cannot lift heavy objects.
Girls are not as strong as boys.
A truck is a boy toy.
A doll is a girl toy.

It should be appreciated that these are only simple examples, and both the rules in the bias risk model as well as the contents of the bias risk trigger data structure and dictionary data structures may be more complex and extensive than what is shown in this example.

Moreover, it should be appreciated that there may be different bias risk annotators 112 and corresponding data structures 113, 114 for different types of bias that is identifiable by the bias identification engine 110, depending on the desired implementation. For example, there may be different bias risk annotators 112 for gender bias identification, political bias identification, religious bias identification, racial bias identification, bias regarding physical impairments, and the like. Thus, depending on the particular bias of interest to the particular implementation, different bias risk annotators 112 may be provided and/or enabled for use with the trained cognitive computing system 120.

The bias risk annotator(s) 112 (hereafter assumed to be a single annotator for ease of description) may operate on the input 130 to the trained cognitive computing system 120, the output generated by the trained cognitive computing system, and/or in some illustrative embodiments the corpus or corpora 140 ingested by the trained cognitive computing system 120 and used by the trained cognitive computing system 120 to generate the results provided in the output of the trained cognitive computing system 120. In some illustrative embodiments, the bias risk annotator 112 of the bias identification engine 110 operates on versions of the input, output, and corpus that have already been annotated by other annotators 122 of the trained cognitive computing system 120. Thus, for example, after the input to be processed, e.g., an input natural language question, 130 has been received by the trained cognitive computing system 120, it is processed by logic of the processing pipeline 126 using trained machine learning and/or rules based computer models, and the annotators 122, to extract features of the input 130 and to annotate portions of the input for use in processing through later stages of the processing pipeline 126. The annotated version of the input 130 may be provided to the bias identification engine 110 for annotation by the bias risk annotator 112. The bias risk annotator 112 may look to particular types of annotations as potentially areas where there may be a bias and then may look for the bias triggers specified for the particular bias risk annotator 112, followed by bias risk annotation if one or more of the rules of the bias risk model used by the bias risk annotator 112 are matched (again using the dictionary data structures to determine if there is a match). If there is a match, a corresponding portion of the input may be annotated as being potentially biased. The portion of the input annotated in this way, e.g., the span of text in the input 130, may be different for different rules being matched, different bias triggers, or the like. For example, for one bias risk rule the span of text may be a single sentence, whereas for another it may be an entire paragraph, entire document, or the like. As such, all other annotations within the span of text may be associated with a bias annotation such that their corresponding portions of the content may be considered potentially biased.

This process may be performed for the output generated by the trained cognitive computing system 120 so that portions of the output that may be potentially biased may be identified, as well as for portions of the corpus 140, such as when electronic content from the corpus 140 is ingested by the trained cognitive computing system 120 for use in performing cognitive computing operations. Where potential bias is identified by the bias risk annotator 112, corresponding bias risk annotations may be added to the metadata associated with the content, whether that is the input or output of the trained cognitive computing system 120, or the ingested corpus 140.

The bias identification engine 110 further comprises a bias source identification engine 115, a bias notification engine 116, a bias test corpus 117, and a bias indication data structure 118. As touched upon above, and described hereafter, the bias source identification engine 115 provides logic for determining, based on an indication that there is a bias risk in the results generated by the trained cognitive computing system 120, whether the source of this bias risk is in the training of the trained cognitive computing system 120 or in the corpus 140. As noted above, this determination may be based on a testing of the trained cognitive computing system 120 using a bias test corpus 117 which is specifically configured to have a substantially balanced amount of biased answers and unbiased answers in the content of the test corpus 117 for particular types of bias, e.g., gender bias. Based on whether biased answers are returned as answers at a statistically significant rate than unbiased answers, a determination may be made as to whether the trained cognitive computing system has bias in the operational parameters it uses, such as in the trained machine learning and/or rule based computer models employed. If there is not a statistically significate rate of the biased answers being returned over the unbiased answers, then the bias is determined to most likely exist in the content of the corpus 140.

Moreover, through testing the trained cognitive computing system 120 using the bias test corpus 117 and test inputs, which may include the input 130 and other test inputs, the operational parameters that contribute more significantly to each returned result, may be identified and corresponding counts may be maintained in the bias indicator data structure 118. In this way, the bias source identification engine 115 may not only determine whether the bias is due to the training of the cognitive computing system 120, but also which operational parameters are likely the ones that are introducing the bias into the results generated due to this training, e.g., the operational parameters whose corresponding counts in the bias indication data structure 118 equal or exceed a predetermined threshold count value.

The bias notification engine 116 provides logic for generating and transmitting the notifications regarding bias, the source of the bias, and/or other details regarding the bias identified by the bias risk annotator 112 and bias source identification engine 115. These notifications may provide, for example, detailed information as to the presence of the bias, including which annotations, feature types, feature values, etc. are biased, which operational parameters of the trained cognitive computing system 120 are likely introducing the bias, or even in some cases where the bias annotation is performed on the ingested corpus 140, what portions of the corpus 140 are likely biased. These notifications of bias 170 may be generated by the bias identification engine 110 and transmitted to an administrator computing device 180 for further consideration in determining how to address the bias that was identified.

The trained cognitive computing system 120, with which the bias identification engine 110 operates, comprises a processing pipeline 126 which processes the input 130 and generates a corresponding output or results based on the content of the ingested corpus 124 which has been annotated by annotators 122 and which has been annotated by the bias risk annotator 112 of the illustrative embodiments. More detail regarding the operation of a cognitive computing system and a processing pipeline of a cognitive computing system will be provided hereafter. However, in accordance with the mechanisms of the illustrative embodiments, the results output 150 generated by the processing pipeline for the input 130 may be annotated to indicate whether or not the results output 150 is biased or is biased. For example, in the case of the trained cognitive computing system being a QA system, the input 130 may be a natural language input question which is to be answered by the trained QA system 120. The input question 130 may be analyzed and annotated to determine whether the input question 130 comprises triggers indicative of potential bias eliciting content. The ingested corpus 124 may likewise be analyzed and annotated to determine portions of content in the ingested corpus 124 that have a risk of being biased. Moreover, the results output 150 itself, i.e. the answer to the input question, may be analyzed and evaluated to determine if there is a risk of bias. If the results output 150 itself has a risk of bias being present, or if the portions of the ingested corpus 124 from which the answer was generated have been annotated as being potentially biased, then the results output 150 may be determined to be potentially biased. As a result, the results output 150 may include bias indicators to indicated to a recipient of the results output 150 that these results may be biased and potentially the reason why these results may be biased. The results output 150 may be provided to the client computing device 160 which was the source of the input 130, e.g., the client computing device 160 used to submit the input natural language question to the trained QA system 120 in this example.

Thus, the present invention provides mechanisms for identifying the potential bias in the operation of a trained cognitive computing system by identifying potential bias in the inputs and outputs of the trained cognitive computing system and testing the trained cognitive computing system to determine whether the training of the cognitive computing system itself has introduced bias into operational parameters, or if the bias is likely a result of bias in the corpus or corpora used by the trained cognitive computing system. Appropriate notifications of such may then be provided to an administrator and results generated by the trained cognitive computing system may be annotated or otherwise indicated to the recipient of these results that the results may be biased and the reasons why it has been determined that these results may be biased. In this way, the administrator or other authorized user is notified that they should review the data being used for training the cognitive computing system and/or the data being used to perform the cognitive operations. If the user determines that there is no bias, or if the bias is intended, then no further action needs to be performed. However, if the user does see some unwanted bias in the training data and/or the corpus of data upon which the trained cognitive system operations, then appropriate adjustments or modifications may be made to compensate for this bias and/or retrain the cognitive computing system.

It can be appreciated that the mechanisms of the illustrative embodiments for identifying bias in the operation of a trained cognitive computing system may be utilized in many different types of data processing environments. In order to provide a context for the description of the specific elements and functionality of the illustrative embodiments, FIGS. 2-4 are provided hereafter as example environments in which aspects of the illustrative embodiments may be implemented. It should be appreciated that FIGS. 2-4 are only examples and are not intended to assert or imply any limitation with regard to the environments in which aspects or embodiments of the present invention may be implemented. Many modifications to the depicted environments may be made without departing from the spirit and scope of the present invention.

Figure 2A:
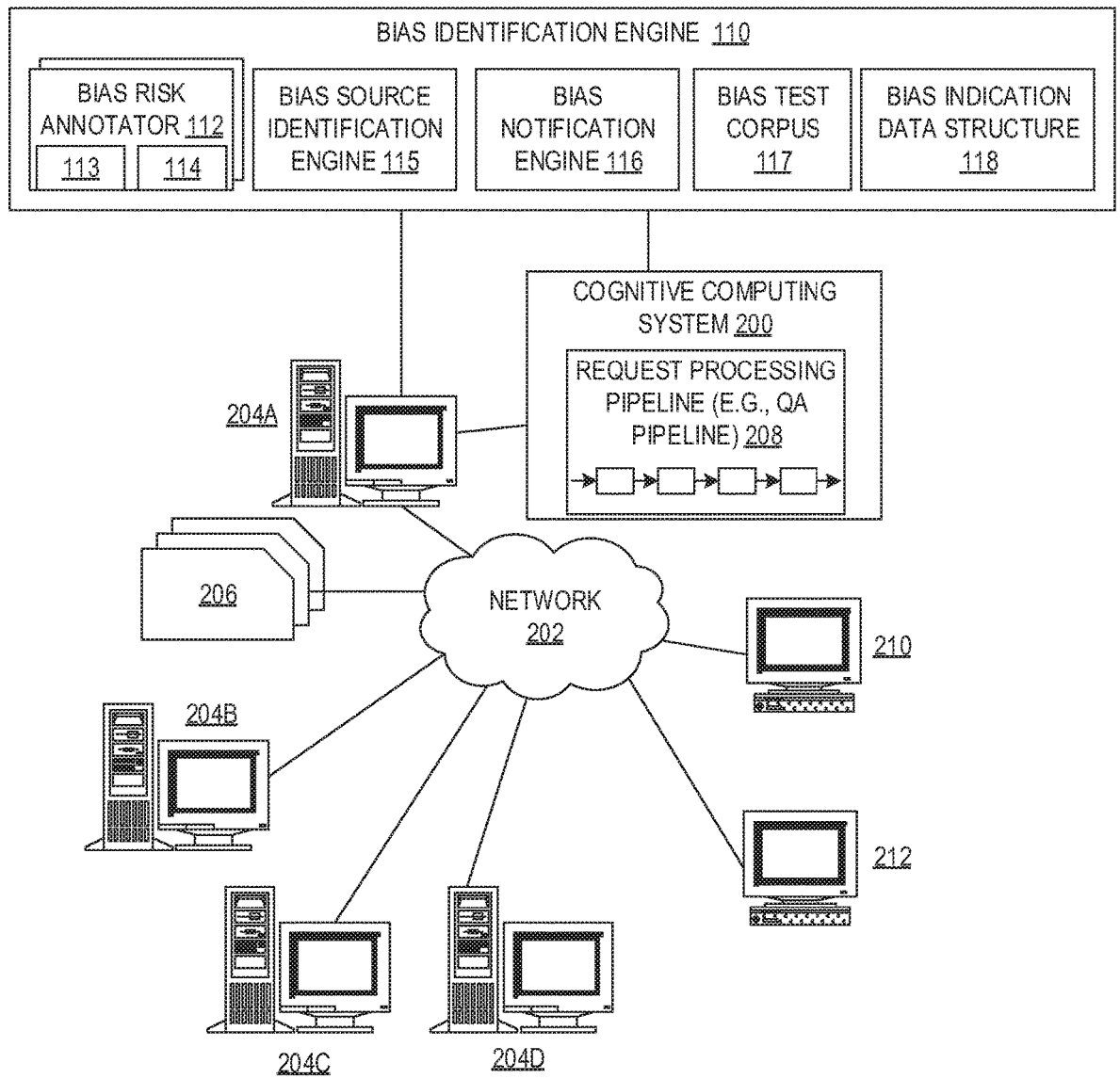
FIG. 2A is an example diagram of a cognitive system with which the bias identification engine may operate in accordance with one illustrative embodiment.
Figure 3:
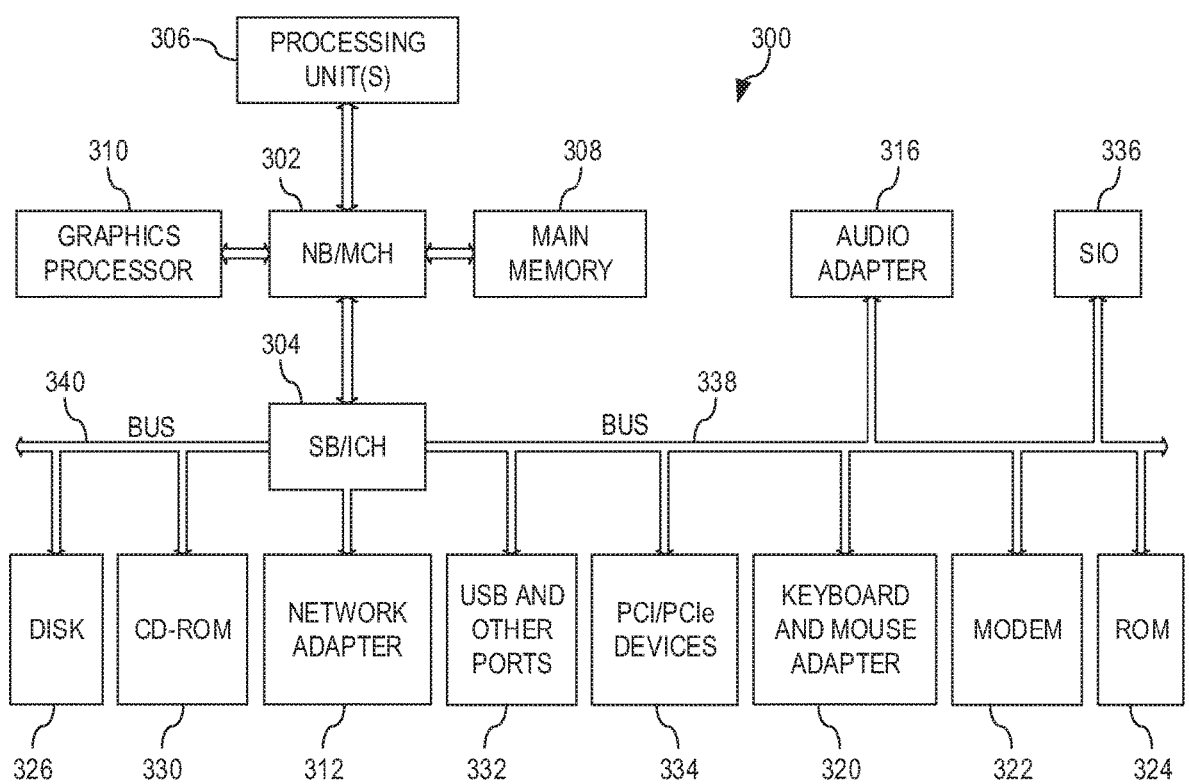
FIG. 3 is a block diagram of an example data processing system in which aspects of the illustrative embodiments are implemented.
Figure 4:
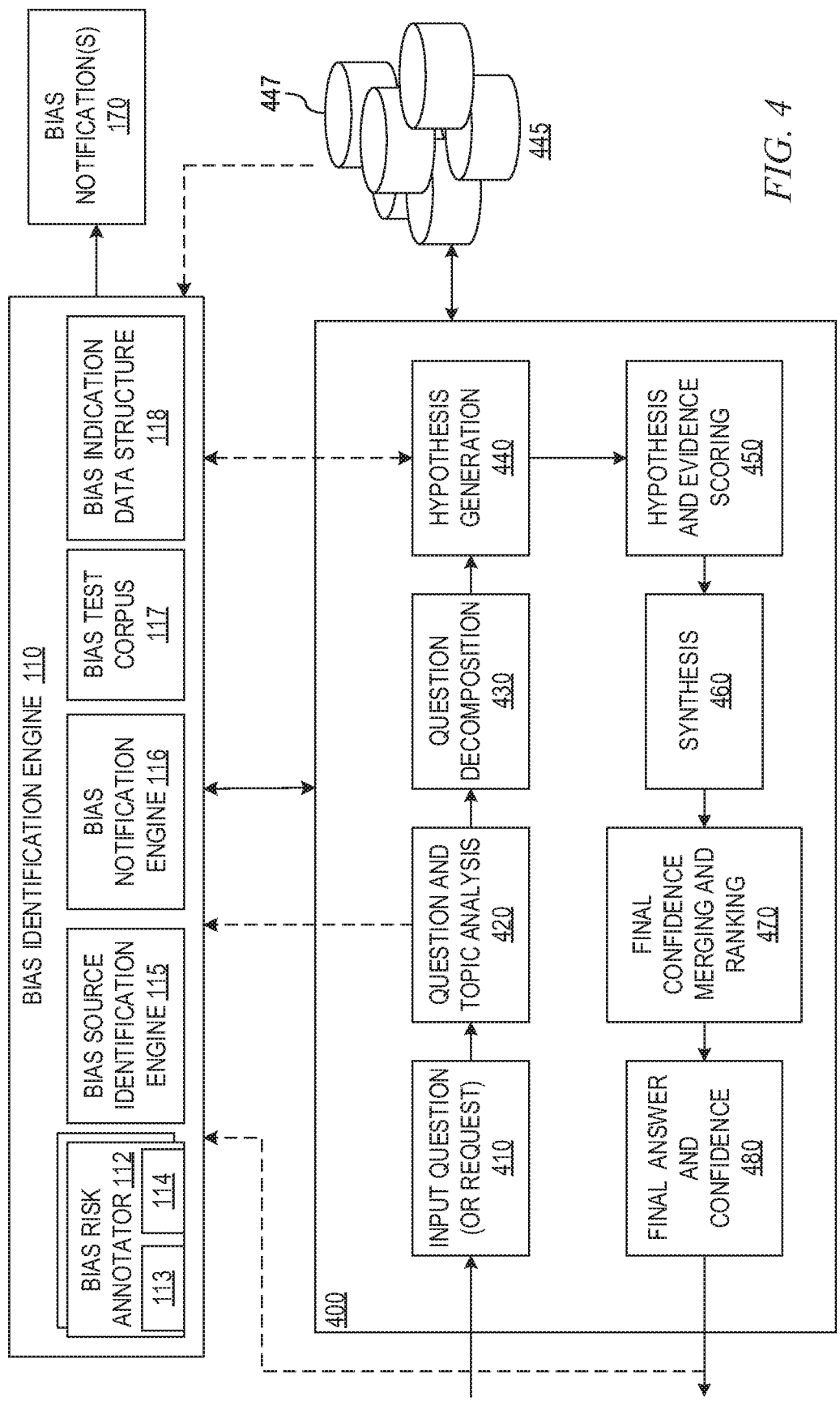
FIG. 4 illustrates a cognitive system processing pipeline for processing a natural language input to generate a response or result in accordance with one illustrative embodiment.

FIGS. 2A-4 are directed to describing an example cognitive system for performing question answering (QA) for one or more domains of input natural language questions. As shown in FIG. 2A, the cognitive computing system 200 (or simply "cognitive system") implements a request processing pipeline 208, such as a Question Answering (QA) pipeline (also referred to as a Question/Answer pipeline or Question and Answer pipeline) for example, request processing methodology, and request processing computer program product with which the mechanisms of the illustrative embodiments are implemented. These requests may be provided as structure or unstructured request messages, natural language questions, or any other suitable format for requesting an operation to be performed by the cognitive system. The computer models employed by the request processing pipeline 208 of the cognitive computing system 200 may be trained to answer questions in one or more domains, such as the medical domain, financial services domain, entertainment domain, etc. and there may be separate pipelines for different domains. The pipeline(s) 208 may support various types of cognitive computing functions. For example, the pipeline(s) 208 and the cognitive computing system 200 as a whole may provide decision support services that provide information, answers to questions, and the like to assist human beings in performing decisions. For example, such decision support services may be used in a medical domain to assist medical personnel in diagnosing medical conditions, generating treatment recommendations for consideration by medical personnel in treating a patient, identifying anomalies in medical images, etc. Similar decision support services are also used in the financial industry as well. In other illustrative embodiments, the cognitive computer system 200 may be utilized to perform cognitive analysis of images for purposes of security of facilities or resources. There are many different implementations of cognitive computing systems 200 which may be improved by the application of the mechanisms of the present invention in conjunction with those of the cognitive computing system 200. For purposes of the example shown in FIG. 2A, it will be assumed that the cognitive computing system is a general question and answer system.

Moreover, each request processing pipeline 208 may have their own associated corpus or corpora, provided by network storage systems, other server and computing systems, that they ingest and operate on, e.g., one corpus for medical domain documents and another corpus for financial domain related documents. In some cases, the request processing pipelines 208 may each operate on the same domain of input questions but may have different configurations, e.g., different annotators or differently trained annotators, such that different analysis and potential answers are generated. The cognitive system 200 may provide additional logic for routing input questions to the appropriate request processing pipeline 208, such as based on a determined domain of the input request, combining and evaluating final results generated by the processing performed by multiple request processing pipelines 208, and other control and interaction logic that facilitates the utilization of multiple request processing pipelines 208.

As noted above, one type of request processing pipeline with which the mechanisms of the illustrative embodiments may be utilized is a Question Answering (QA) pipeline. The description of example embodiments of the present invention herein assumes a QA pipeline as an example of a request processing pipeline that may be augmented to include mechanisms in accordance with one or more illustrative embodiments. It should be appreciated that while the present invention is described in the context of the cognitive system 200 implementing one or more QA pipelines 208 that operate on an input question, the illustrative embodiments are not limited to such. Rather, the mechanisms of the illustrative embodiments may operate on requests that are not posed as "questions" but are formatted as requests for the cognitive system to perform cognitive operations on a specified set of input data using the associated corpus or corpora and the specific configuration information used to configure the cognitive system 200. For example, rather than asking a natural language question of "What diagnosis applies to patient P?", the cognitive system may instead receive a request of "generate diagnosis for patient P," or the like. It should be appreciated that the mechanisms of the QA system pipeline 208 may operate on requests in a similar manner to that of input natural language questions with minor modifications. In fact, in some cases, a request may be converted to a natural language question for processing by the QA system pipelines 208 if desired for the particular implementation.

As will be discussed herein, the illustrative embodiments may be integrated in, augment, and extend the functionality of these QA pipeline, or request processing pipeline, mechanisms of a healthcare cognitive system with regard to identifying whether or not there is bias in the training of one or more of the computer models implemented by the cognitive computing system 200 and request processing pipeline 208, and identification of the source of bias as to whether the bias originates from the training of the computer model or is present in the data upon which the computer model operates. A bias identification engine 110 operates in conjunction with the cognitive computing system 200 to identify such bias and provide bias notifications to appropriate personnel so that responsive actions may be taken to reduce the influence of such bias, or in some cases confirm or increase a desired bias.

As an exemplary embodiment is implemented with regard to a QA cognitive system 200 and a QA pipeline 208, it is important to have an understanding of how such QA cognitive systems and question and answer creation in a QA cognitive system implementing a QA pipeline is implemented. It should be appreciated that the mechanisms described in FIGS. 2-4 are only examples and are not intended to state or imply any limitation with regard to the type of cognitive system mechanisms with which the illustrative embodiments are implemented. Many modifications to the example cognitive system shown in FIGS. 2-4 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process, but within the limitations of a computer architecture, as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, financial trend analysis, financial investment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. The IBM Watson™ cognitive system has many different implementations in which the IBM Watson™ cognitive system has been configured for different cognitive functions, e.g., IBM Chef Watson™ generates recipes for users, IBM Watson Ads™ provides a artificial intelligence (AI) solution for advertising, provides an advertising, IBM Watson Health™ provides a number of different tools for implementing AI solutions to perform various patient health related cognitive computing functions, etc. In general, such cognitive systems are able to perform the following functions:

- Navigate the complexities of human language and understanding
- Ingest and process vast amounts of structured and unstructured data
- Generate and evaluate hypothesis
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice) (memorization and recall)
- Predict and sense with situational awareness that mimic human cognition based on experiences
- Answer questions based on natural language and specific evidence In one aspect, cognitive systems provide mechanisms for answering questions posed to these cognitive systems using a Question Answering pipeline or system (QA system) and/or process requests which may or may not be posed as natural language questions. The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the cognitive system, such as cognitive computing system 200, which implements the QA pipeline, such as QA pipeline 208. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data and the results returned to those queries, the QA pipeline generates a set of hypotheses, or candidate answers to the input question, such as by looking across the corpus of data for portions of the corpus of data that have some potential for containing a valuable response to the input question. The QA pipeline then performs deep analysis, using reasoning algorithms, on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

Referring again to FIG. 2A, this figure depicts a schematic diagram of one illustrative embodiment of a cognitive system 200 implementing a request processing pipeline 208, which in some embodiments may be a question answering (QA) pipeline, in a computer network 202. For purposes of the present description, the request processing pipeline 208 is assumed to be implemented as a QA pipeline that operates on structured and/or unstructured requests in the form of input questions. One example of a question processing operation which may be used in conjunction with the principles described herein is described in U.S. Patent Application Publication No. 2011/0125734, which is herein incorporated by reference in its entirety. The cognitive system 200 is implemented on one or more computing devices 204A-D (comprising one or more processors and one or more memories, and potentially any other computing device elements generally known in the art including buses, storage devices, communication interfaces, and the like) connected to the computer network 202. For purposes of illustration only, FIG. 2A depicts the cognitive system 200 being implemented on computing device 204A only, but as noted above the cognitive system 200 may be distributed across multiple computing devices, such as a plurality of computing devices 204A-D. The network 202 includes multiple computing devices 204A-D, which may operate as server computing devices, and 210-212 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 200 and network 202 enables question processing and answer generation (QA) functionality for one or more cognitive system users via their respective computing devices 210-212. In other embodiments, the cognitive system 200 and network 202 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 200 may be used with components, systems, sub-systems, and/or devices other than those that are depicted herein.

The cognitive system 200 is configured to implement a request processing pipeline 208 that receive inputs from various sources. The requests may be posed in the form of a natural language question, natural language request for information, natural language request for the performance of a cognitive operation, or the like. For example, the cognitive system 200 receives input from the network 202, a corpus or corpora of electronic documents 206, cognitive system users, and/or other data and other possible sources of input. In one embodiment, some or all of the inputs to the cognitive system 200 are routed through the network 202. The various computing devices 204A-D on the network 202 include access points for content creators and cognitive system users. Some of the computing devices 204A-D include devices for a database storing the corpus or corpora of data 206 (which is shown as a separate entity in FIG. 2A for illustrative purposes only). Portions of the corpus or corpora of data 206 may also be provided on one or more other network attached storage devices, in one or more databases, or other computing devices not explicitly shown in FIG. 2. The network 202 includes local network connections and remote connections in various embodiments, such that the cognitive system 200 may operate in environments of any size, including local and global, e.g., the Internet.

In one embodiment, the content creator creates content in a document of the corpus or corpora of data 206 for use as part of a corpus of data with the cognitive system 200. The document includes any file, text, article, or source of data for use in the cognitive system 200. Cognitive system users access the cognitive system 200 via a network connection or an Internet connection to the network 202, and input questions/requests to the cognitive system 200 that are answered/processed based on the content in the corpus or corpora of data 206. In one embodiment, the questions/requests are formed using natural language. The cognitive system 200 parses and interprets the question/request via a pipeline 208, and provides a response to the cognitive system user, e.g., cognitive system user 210, containing one or more answers to the question posed, response to the request, results of processing the request, or the like. In some embodiments, the cognitive system 200 provides a response to users in a ranked list of candidate answers/responses while in other illustrative embodiments, the cognitive system 200 provides a single final answer/response or a combination of a final answer/response and ranked listing of other candidate answers/responses.

The cognitive system 200 implements the pipeline 208 which comprises a plurality of stages for processing an input question/request based on information obtained from the corpus or corpora of data 206. The pipeline 208 generates answers/responses for the input question or request based on the processing of the input question/request and the corpus or corpora of data 206. The pipeline 208 will be described in greater detail hereafter with regard to FIG. 4.

In some illustrative embodiments, the cognitive system 200 may be the IBM Watson™ cognitive system available from International Business Machines Corporation of Armonk, N.Y., which is augmented with the mechanisms of the illustrative embodiments described hereafter. As outlined previously, a pipeline of the IBM Watson™ cognitive system receives an input question or request which it then parses to extract the major features of the question/request, which in turn are then used to formulate queries that are applied to the corpus or corpora of data 206. Based on the application of the queries to the corpus or corpora of data 206, a set of hypotheses, or candidate answers/responses to the input question/request, are generated by looking across the corpus or corpora of data 206 for portions of the corpus or corpora of data 206 (hereafter referred to simply as the corpus 206) that have some potential for containing a valuable response to the input question/response (hereafter assumed to be an input question). The pipeline 208 of the IBM Watson™ cognitive system then performs deep analysis on the language of the input question and the language used in each of the portions of the corpus 206 found during the application of the queries using a variety of reasoning algorithms.

The scores obtained from the various reasoning algorithms are then weighted against a statistical model that summarizes a level of confidence that the pipeline 208 of the IBM Watson™ cognitive system 200, in this example, has regarding the evidence that the potential candidate answer is inferred by the question. This process is repeated for each of the candidate answers to thereby generate a ranked listing of candidate answers which may then be presented to the user that submitted the input question, e.g., a user of client computing device 210, or from which a final answer is selected and presented to the user. More information about the pipeline 208 of the IBM Watson™ cognitive system 200 may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As noted above, while the input to the cognitive system 200 from a client device may be posed in the form of a natural language question, the illustrative embodiments are not limited to such. Rather, the input question may in fact be formatted or structured as any suitable type of request which may be parsed and analyzed using structured and/or unstructured input analysis, including but not limited to the natural language parsing and analysis mechanisms of a cognitive system such as IBM Watson™, to determine the basis upon which to perform cognitive analysis and providing a result of the cognitive analysis. In the case of a healthcare based cognitive system, for example, this analysis may involve processing patient medical records, medical guidance documentation from one or more corpora, and the like, to provide a healthcare oriented cognitive system result, such as a treatment recommendation, suggested diagnosis, identification of applicable medical codes, or any of a plethora of other healthcare related cognitive computing system functions.

As shown in FIG. 2A, the cognitive system 200 is further augmented, in accordance with the mechanisms of the illustrative embodiments, to include logic implemented in specialized hardware, software executed on hardware, or any combination of specialized hardware and software executed on hardware, for implementing a bias identification engine 110, executing on the one or more server computing devices 204A-D (shown as only being associated with server 204A for purposes of illustration), which operates in conjunction with the cognitive computing system 200 to identify potential bias in the operation of the cognitive computing system 200 and/or trained computer models implemented as part of the request processing pipeline 208. These trained computer models may be machine learning based computer models, rules based computer models, or any other artificial intelligence based computer models in which operational parameters are trained through a machine learning process. For example, taking gender bias as an example bias being evaluated, the bias identification engine 110 utilizes its mechanisms 112-118 in the manner previously described above with regard to FIG. 1, to identify whether bias likely exists in the output generated by the cognitive computing system 200 and then determines the most likely source of this bias in the operation of the cognitive computing system, such as in the training of the computer model(s) or in the data upon which the cognitive computing system 200 operates. The bias identification engine 110 marks or flags potential biased outputs of the cognitive computing system such that a notification of the potential for bias in the outputs may be provided along with the outputs to the requestor computing devices, e.g., client computing devices 210, 212. The bias identification engine 110 also sends appropriate notifications to authorized personnel to inform them of the bias and the source of the bias, which in some cases may identify specific operational parameters that contribute to the biased output more significantly than other operational parameters, which portions of a corpus have content that is likely biased, or the like.

As shown in FIG. 2A and described previously with regard to FIG. 1, the bias identification engine 110 comprises one or more bias risk annotators 112 that operate to evaluate the input to the trained cognitive computing system 200 and the output of the trained cognitive computing system 200 to determine whether there is bias in the operation of the trained cognitive computing system 200. A knowledge base that specific indicators, i.e. bias triggers, of particular types of bias, e.g., gender bias, is used in some illustrative embodiments to determine whether the cognitive computing system itself is biasing the results generated. For example, in the case of a trained question answering (QA) cognitive computing system, the input question may be analyzed by the bias risk annotator 112 to determine if the input question specifies a concept that may expose a bias in the cognitive computing system 200, e.g., the input question specifies a gender. The results generated by the cognitive computing system may be evaluated against the knowledge base to determine if the results have indicators of potential bias in the cognitive computing system, e.g., the input question asks about a best toy for a girl and the answer generated indicates a "pink" item, a "dollhouse", a "doll", or the like. As described previously, these bias indicators may be provided in the form of rules data structures of bias risk models which specify a bias trigger and a pattern of contextual content that is indicative of a potential for bias in the natural language content.

The bias risk annotator 112, based on the evaluation of the input and the output of the trained cognitive computing system 200, may annotate, flag, or otherwise indicate portions of the input and the output as having a bias. For example, when a QA cognitive computing system 200 operates on an input question, the QA cognitive system 200 uses an annotated in-memory representation of structured and/or unstructured electronic documents from one or more corpora 206 as a basis for generating a result, or answer, for the input question, as described above. With the bias risk annotator 112, the context surrounding the annotated portions of the in-memory representations may be evaluated using the knowledge base, i.e. the rules data structures of the bias risk model implemented by the bias risk annotator 112, the bias triggers 113, and the dictionary data structures 114, to determine if there is a bias associated with these annotated portions and such bias may then be annotated or flagged in the in-memory representation of the electronic document such that any results generated using these annotated portions of the electronic document as a basis may likewise be annotated or flagged as potentially biased.

Once bias in the input or the output is identified by the bias risk annotator, additional analysis may be performed regarding the electronic corpus to determine whether the results were driven by the corpus 206 or driven by the cognitive computing system 200 training, i.e. training of the computer model(s) (e.g., neural networks, rules based engines, or any other machine learning computer model) implemented by the cognitive computing system 200 and/or request processing pipeline 208 to perform artificial intelligence operations.

In some cases, a bias test corpus 117 may be utilized that has a known even amount of bias answers and non-biased answers in it so that it can be determined which answers are surfaced by the trained cognitive computing system 200 such that bias in the operation of the cognitive computing system 200 training may be identified. For example, test questions associated with the bias test corpus 117 may be submitted to the cognitive computing system 200 which then operates on these test questions using its already trained set of operational parameters, using the bias test corpus 117. If the trained cognitive computing system 200 surfaces a statistically significant higher amount of biased answers than it does unbiased answers in the bias test corpus 117, it can be determined that the training of the trained cognitive computing system 200 has trained operational parameters that introduce a bias in the results or output generated by the trained cognitive computing system 200. If the trained cognitive computing system 200 does not surface a statistically significant higher amount of biased answers than it does unbiased answers in the bias test corpus 117, then it can be determined that the likely source of bias in the output of the trained cognitive computing system 200 is the data upon which it operates, i.e. the corpus 206.

In some illustrative embodiments, the operational parameters which contributed most to the results generated by the trained cognitive computing system 200 may be identified, in a similar manner as is done during the training of the cognitive computing system using a machine learning process. These operational parameters may then be flagged or otherwise marked, such as in a bias indication data structure, as potentially biased for later examination and/or retraining. In some illustrative embodiments, this may be done for multiple inputs to see which operational parameters are most influential and determine how often the same operational parameters appear in the most influential operational parameters for biased answers, e.g., a separate counter or count of the number of times may be stored in the bias indication data structure 118 for each operational parameter. This count of occurrences of the operational parameters in the bias indication data structure 118 may then be compared to one or more threshold values to determine if the number of occurrences indicate bias in the training of the operational parameter, e.g., if the count is equal to or greater than a threshold value in the one or more threshold values.

Once bias is determined to exist in the operation of the trained cognitive computing system 200 or the corpus/corpora 206, a notification may be sent to an administrator or other authorized personnel, through their computing system, such as a client computing system 212 or the like, to inform them of the bias so that appropriate corrective actions may be performed. The notification may comprise, in some illustrative embodiments, an indication of which operational parameters of the trained cognitive computing system 200 contributed most to the biased results generated by the trained cognitive computing system 200, which may be determined based on the comparison of the counts in the bias indication data structure 117 to the one or more thresholds. The notification may comprise a list of annotations in the results generated by the trained cognitive computing system 200 that contain a bias risk as identified by the bias risk annotator. The notification may specify bias risk indicators over annotations, bias risk indicators over feature types, and/or bias risk indicators over feature values, for example. With regard to bias found to be present in the trained cognitive computing system 200, the notification may initiate a retraining of the cognitive computing system 200, for example.

If the bias is determined to not be due to the training of the trained cognitive computing system 200, then the notification may indicate that there is bias in the corpus/corpora 206 that is affecting the operation of the trained cognitive computing system 200. This will allow the administrator or other authorized personnel to contact providers of the corpus/corpora 206 to determine how to address the bias, or may cause the administrator or other authorized personnel to select a different corpus or corpora to use as a basis for the operation of the trained cognitive computing system 200, for example. In some cases, modifications to the corpus/corpora 206 may be made to reduce bias in the corpus/corpora.

In some illustrative embodiments, when the results of the trained cognitive computing system 200 are returned to a requestor via their computing device, the results may be flagged or otherwise indicated as potentially being biased, and that flag or indicator is presented to the requestor, e.g., via their client computing device 210 for example, along with the results. It should be appreciated that in some illustrative embodiments, the cognitive computing system 200 may return a listing of potential correct results to the requestor and thus, some of these may be flagged as biased while others may not be flagged as biased in the returned results.

As mentioned previously, the bias risk annotator 112 of the bias identification engine 110 may be applied to any portion of textual content in which bias may exist and is not limited to just the input and output of the cognitive computing system 200. For example, as part of the operation of a cognitive computing system 200, the corpus or corpora 206 that the cognitive computing system 200 uses to generate results are ingested into an in-memory representation of the content. As part of this ingestion, portions of the text are annotated by annotators to identify various portions of speech useful in generating results, e.g., identification of proper names, particular entities such as persons, places, things, negative terms/phrases, hypothetical terms/phrases, medical codes, medical terms/phrases, etc. The bias risk annotator 112 may execute as another one of these annotators that indicates the potential risk of bias in a portion of text based on the presence of a bias risk trigger in the contextual text surrounding annotations found by one or more of the other annotators. For example, particular entity annotations may be used as a basis upon which to perform annotation of the context surround the entity annotations to determine if bias risk triggers are present, e.g., for a gender bias implementation, entities representing people may be used as a basis for analyzing the textual context surrounding the entities to determine if a bias risk trigger (or "bias trigger") is present.

In this way, the in-memory representation of the content of the corpus/corpora is annotated for potential bias. In some cases, if a bias trigger is present, a portion of the content is determined to be potentially biased, which may be different depending on the particular bias trigger found, e.g., a sentence for one bias trigger, a paragraph for another bias trigger, an entire section or entire document for other bias triggers. The corresponding portion of the content is then annotated as potentially containing bias. This bias annotation may then be used to automatically associated with any results generated by the trained cognitive computing system 200, which rely on the portion of the content for the result that is generated, to be flagged or otherwise indicated as potentially biased, e.g., if the answer to an input question is found in the portion of content, then that answer may be flagged as potentially biased. This flagging of the result as potentially biased may be used as a trigger to trigger the bias risk annotator 112 to operate on the corresponding results as previously described above to determine if the results themselves contain a potential bias in the content of those results. If both the flagging indicates bias and bias is found to potentially exist in the results output itself, then the notifications and responsive operations described previously may be performed, including testing the trained cognitive computing system 200 to determine if the bias exists in the training of the cognitive computing system 200 or in the corpus/corpora 206. In this case, however, the flagging of the results based on the results being generated based on a potentially biased portion of content in the corpus/corpora 206 is already known to exist. However, bias may also exist in the training of the cognitive computing system 200 and thus, the test may be performed to determine if the training is biased as well.

Moreover, as noted previously, one responsive action that may be taken in response to a notification that bias may exist in the corpus/corpora 206, is to modify the corpus/corpora 206 to reduce the amount of bias present. In this illustrative embodiment, through annotation of the corpus/corpora 206 using the bias risk annotator 112 during the ingestion operation, it is known which portions of content in the corpus/corpora 206 contain potential bias which influences certain results generated by the trained cognitive computing system 200. As a result, it is known which portions of content may be removed from the corpus/corpora 206 or otherwise modified in order to reduce bias in the corpus/corpora 206. Thus, these portions of content may be identified in the notification to the authorized personnel such that they may then perform operations to modify the corpus/corpora 206 with specific attention to the identified portions of content, so as to remove or reduce the bias present in the corpus/corpora 206.

Thus, with the mechanisms of the illustrative embodiments, bias in the training of the cognitive computing system 200 and/or the corpus/corpora 206 used by the trained cognitive computing system 200 may be identified. By identifying this bias being present, appropriate notifications may be sent to authorized personnel to inform them of the bias and initiate corrective actions to reduce the influence of bias in the operation of the trained cognitive computing system 200, when appropriate, such as by retraining the cognitive computing system 200, selecting a different corpus/corpora 206 as a basis, or even modifying the corpus/corpora 206 to reduce bias in the corpus/corpora 206. In this way, bias in the results generated by trained cognitive computing systems 200 may be reduced resulting in better results being generated by the trained cognitive computing system 200.

FIG. 2B is an example diagram of results returned by a cognitive computing system in response to an input request in accordance with one illustrative embodiment. As shown in FIG. 2B, the results generated, in the depicted example, includes a ranked listing 220 of answers to the input question along with their corresponding scores, or confidence values, in terms of percentages. In addition, for those answers that may be determined to be biased, either as a result of the training of the cognitive computing system or bias present in the corpus/corpora, a marker 230 is provided along with a textual notification informing the user that submitted the input question that these answers may be biased. In the depicted example, some answers are indicated to be potentially biased while others are not because the example is one in which the bias is determined to have originated in the corpus and only those answers that were generated based on portions of content in the corpus that were annotated to contain potential bias are marked in the output notification of FIG. 2B.

FIG. 2C provides examples of notifications that may be sent regarding the existence and source of bias in the operation of a trained cognitive computing system in accordance with one illustrative embodiment. In a first notification 240, the notification comprises a statement as to the likely presence of bias in the training of the cognitive computing system, as well as the operational parameters that are most influential in the biased operation and their relative percentages (determined based on the counts in the bias indication data structure) of times that those operational parameters have contributed to a biased result generated by the trained cognitive computing system within the evaluation time period or over a particular set of test questions or number of input questions. In this case, the operational parameters are weights applied by nodes in a neural network computer model and thus, the notification identifies the node id and the weight id within the neural network computer model. In this way, the human administrator is informed of where the bias in the training of the cognitive computing system is most likely located and thus, corrective actions may be taken, e.g., manually readjusting the weight values, retraining the cognitive computing system using machine learning training, or the like.

In a second notification 250, the notification comprises a statement as to the likely presence of bias in the corpus. The notification comprises a listing of document identifiers and location identifiers within the corresponding documents, e.g., section identification and character offset with text spans, where the bias is determined to potentially be present. In some cases, the notification may include the actual text itself that contains the bias risk trigger and matches the rule data structure of the bias risk model used by the bias risk annotator. It should be appreciated that these are only examples of possible notifications that may be transmitted by the bias notification engine and many modifications may be made without departing from the spirit and scope of the present invention.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 3 is provided as an example of one type of data processing system in which aspects of the present invention may be implemented. Many other types of data processing systems may be likewise configured to specifically implement the mechanisms of the illustrative embodiments.

FIG. 3 is a block diagram of an example data processing system in which aspects of the illustrative embodiments are implemented. Data processing system 300 is an example of a computer, such as server 204A or client 210 in FIG. 2A, in which computer usable code or instructions implementing the processes for illustrative embodiments of the present invention are located. In one illustrative embodiment, FIG. 3 represents a server computing device, such as a server 204A, which implements a cognitive system 200, QA system pipeline 208, as well as the bias identification engine 110. However, it should be appreciated that in some illustrative embodiments, the bias identification engine 110 may in fact be provided on a separate computing system from that of the cognitive computing system, such as another server 204B. FIG. 3 is just an example of one type of computing system in which the cognitive computing system 200, pipeline 208, and/or bias identification engine 110 may be implemented and other architectures may also be utilized.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 is connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 is connected to SB/ICH 304.

An operating system runs on processing unit 306. The operating system coordinates and provides control of various components within the data processing system 300 in FIG. 3. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 300.

As a server, data processing system 300 may be, for example, an IBM® eServer™ System P® computer system, running the Advanced Interactive Executive (AIX®) operating system or the LINUX® operating system. Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and are loaded into main memory 308 for execution by processing unit 306. The processes for illustrative embodiments of the present invention are performed by processing unit 306 using computer usable program code, which is located in a memory such as, for example, main memory 308, ROM 324, or in one or more peripheral devices 326 and 330, for example.

A bus system, such as bus 338 or bus 340 as shown in FIG. 3, is comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, includes one or more devices used to transmit and receive data. A memory may be, for example, main memory 308, ROM 324, or a cache such as found in NB/MCH 302 in FIG. 3.

Those of ordinary skill in the art will appreciate that the hardware depicted in FIGS. 2A and 3 may vary depending on the implementation. Other internal hardware or peripheral devices, such as flash memory, equivalent non-volatile memory, or optical disk drives and the like, may be used in addition to or in place of the hardware depicted in FIGS. 2A and 3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device that is configured with flash memory to provide non-volatile memory for storing operating system files and/or user-generated data, for example. Essentially, data processing system 300 may be any known or later developed data processing system without architectural limitation.

FIG. 4 illustrates an example of a cognitive system processing pipeline which, in the depicted example, is a question and answer (QA) system pipeline used to process an input question in accordance with one illustrative embodiment. As noted above, the cognitive systems with which the illustrative embodiments may be utilized are not limited to QA systems and thus, not limited to the use of a QA system pipeline. FIG. 4 is provided only as one example of the processing structure that may be implemented to process a natural language input requesting the operation of a cognitive system to present a response or result to the natural language input.

The QA system pipeline of FIG. 4 may be implemented, for example, as QA pipeline 208 of cognitive system 200 in FIG. 2A. It should be appreciated that the stages of the QA pipeline shown in FIG. 4 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 4 is augmented in one or more of the stages to implement elements of the improved mechanisms for bias identification in accordance with one illustrative embodiment or otherwise interface with the improved mechanisms for bias identification of the illustrative embodiments, e.g., the bias identification engine 110. In some cases, additional stages may be provided to implement the improved mechanism, or separate logic from the pipeline 400 may be provided for interfacing with the pipeline 400 and implementing the improved functionality and operations of the illustrative embodiments with regard to bias identification as previously described above. In the depicted example, the bias identification engine 110 is shows as separate logic with which one or more of the stages of the pipeline 400 interface to achieve the bias identification when processing input requests (or questions) and generating results (or answers).

As shown in FIG. 4, the QA pipeline 400 comprises a plurality of stages 410-480 through which the cognitive system operates to analyze an input question and generate a final response. In an initial question input stage 410, the QA pipeline 400 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 400, i.e. the question and topic analysis stage 420, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 4, the identified major features are then used during the question decomposition stage 430 to decompose the question into one or more queries that are applied to the corpora of data/information 445 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 445. That is, these various sources themselves, different collections of sources, and the like, represent a different corpus 447 within the corpora 445. There may be different corpus 447 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 447 within the corpora 445.

The queries are applied to one or more databases storing information about the electronic texts, documents, articles, websites, and the like, that make up the corpus of data/information, e.g., the corpus of data 206 in FIG. 2A. The queries are applied to the corpus of data/information at the hypothesis generation stage 440 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 440, to generate hypotheses for answering the input question. These hypotheses are also referred to herein as "candidate answers" for the input question. For any input question, at this stage 440, there may be hundreds of hypotheses or candidate answers generated that may need to be evaluated.

The QA pipeline 400, in stage 450, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 460, the large number of scores generated by the various reasoning algorithms are synthesized into confidence scores or confidence measures for the various hypotheses. This process involves applying weights to the various scores, where the weights have been determined through training of the statistical model employed by the QA pipeline 400 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 400 that identifies a manner by which these scores may be combined to generate a confidence score or measure for the individual hypotheses or candidate answers. This confidence score or measure summarizes the level of confidence that the QA pipeline 400 has about the evidence that the candidate answer is inferred by the input question, i.e. that the candidate answer is the correct answer for the input question.

The resulting confidence scores or measures are processed by a final confidence merging and ranking stage 470 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 480, a final answer and confidence score, or final set of candidate answers and confidence scores, are generated and output to the submitter of the original input question via a graphical user interface or other mechanism for outputting information.

As shown in FIG. 4, in accordance with one illustrative embodiment, the bias identification engine 110 operates in conjunction with the pipeline 400. The elements 112-118 of the bias identification engine 110 may operate in conjunction with one or more of the stages 410-480 of the pipeline 400 to evaluate the operation of the trained cognitive computing system to determine if there is bias introduced by the training of the cognitive computing system or bias due to content of the corpus. For example, the bias identification engine 110 may receive the annotated input question from the question and topic analysis stage 420 and may annotate the input question regarding whether there is a bias risk trigger in the input question. In addition, the bias identification engine 110 may receive the final output of the pipeline 400 from the final answer and confidence stage 480 and may analyze and annotate the output with regard to the presence of bias risk triggers and/or satisfying of one or more rule data structures of the bias risk annotator 112 based on the bias risk triggers 113 and dictionary data structures 114. Based on whether there is detected potential bias in the input and output of the pipeline 400, testing of the pipeline 400 using the bias test corpus 117 and test questions may be initiated to determine if the bias is due to training of computer models used by the pipeline 400 or if the bias is likely from the corpus 447 or corpora 445 used by the pipeline 400.

As previously mentioned above, in some illustrative embodiments, the corpus 447 or corpora 445 may be annotated with regard to bias risk during an ingestion operation. These annotations may be added to the ingested in-memory representation of the content from the corpus/corpora and may be used as a basis for annotating or otherwise marking results generated by the pipeline 400 based on these portions of content, as potentially being biased and may also be used in the determination as to whether the bias is due to training of the computer models used by the trained cognitive computing system, due to bias in the corpus/corpora, or both.

Figure 5:
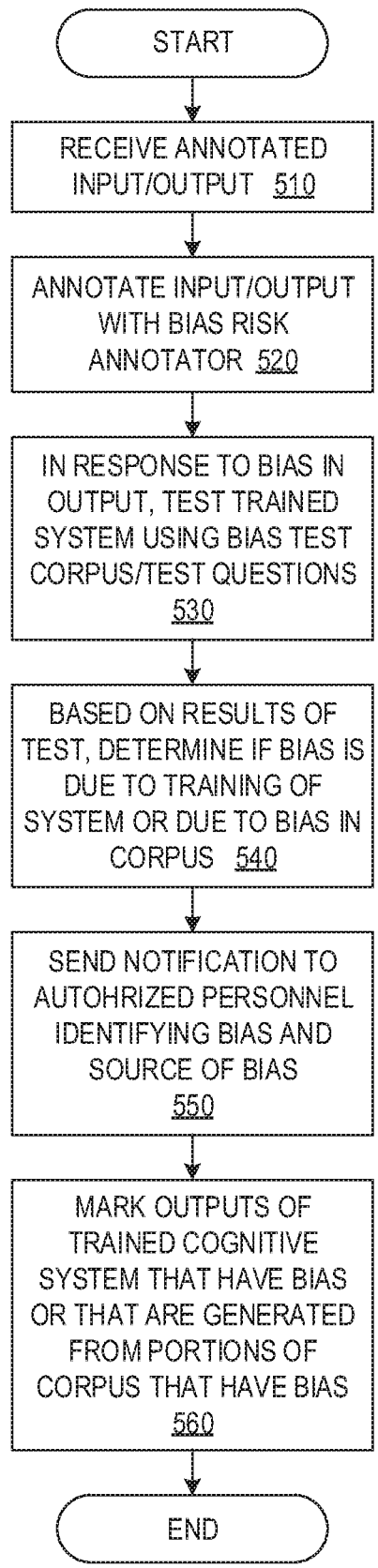
FIG. 5 is a flowchart outlining an example operation of a bias identification engine in accordance with one illustrative embodiment.

FIG. 5 is a flowchart outlining an example operation of a bias identification engine in accordance with one illustrative embodiment. As shown in FIG. 5, the operation starts by receiving the annotated input and output of a trained cognitive computing system which has been annotated by annotators of the trained cognitive computing system (step 510). The input and output are processed by a bias risk annotator to determine if there is a bias risk in the input and/or output and annotate the portions of the input and output that have content matching one or more rule data structures of the bias risk annotator (step 520). In response to there being a bias risk in the output of the trained cognitive computing system, a testing of the trained cognitive computing system is initiated using a bias test corpus and a set of test inputs (step 530). Based on results of testing of the trained cognitive computing system, a determination is made as to whether or not the bias is likely from a training of the trained cognitive computing system or is likely due to bias in the corpus being used (step 540). A notification indicating the presence and source of bias is generated and sent to authorized personnel (step 550). In addition, outputs generated in response to processing inputs by the trained cognitive computer system are marked as being potentially biased in response to bias being detected in the outputs themselves and/or bias being present in the portions of content from the ingested corpus from which the outputs are generated (step 560). The operation then terminates.

It should be appreciated that while the above illustrative embodiments are described with regard to a cognitive computing system implementing or employing a question answering system and pipeline in which one or more computer models are utilized, the present invention is not limited to such. This is only one possible implementation of the mechanisms of the illustrative embodiment. The mechanisms of the illustrative embodiments may be utilized with any trained cognitive computing system and/or trained computer model in which the training may be biased due to the training process and/or the data upon which the training is performed, or due to the corpus of data used by the trained cognitive computing system and/or trained computer model to perform its cognitive computing operations. For example, in some illustrative embodiments, the cognitive computing system and/or computer model may run analysis of unstructured text in a batch manner, not in a question/answer form, for example.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and memory, the memory comprising instructions executed by the processor to cause the processor to implement a bias identification engine that identifies bias in the operation of a trained cognitive computing system, the method comprising:

configuring a bias risk annotator of the bias identification engine to identify a plurality of bias triggers in inputs to the trained cognitive computing system and outputs of the trained cognitive computing system based on a bias risk trigger data structure that specifies terms or phrases that are associated with a bias, wherein the trained cognitive computing system is an artificial intelligence computing system trained by a machine learning computer operation to generate the outputs based on the inputs to the trained cognitive computing system;

executing the trained cognitive computing system on an annotated input to the trained cognitive computing system and generating an annotated output, by the trained cognitive computing system, based on a first corpus of electronic content;

processing, by the bias risk annotator, the annotated input and the annotated output to determine whether the annotated input or annotated output comprises a portion of content that contains a bias trigger in the plurality of bias triggers;

in response to at least one of the annotated input or annotated output comprising a portion of content containing a bias trigger in the plurality of bias triggers, transmitting, by a bias notification engine of the bias identification engine, a notification to an administrator computing device, wherein the notification specifies the presence of bias in the operation of the trained cognitive computing system; and in response to at least one of the annotated input or the annotated output comprising a portion of content containing a bias trigger:
  testing, by a bias source identification engine of the bias identification engine, the trained cognitive computing system using a set of bias test questions and a bias test corpus having a predetermined balance of biased results and unbiased results, to determine whether the trained cognitive computing system returns biased results from the bias test corpus at a higher amount than the trained cognitive computing system returns unbiased results from the bias test corpus;
  determining, by the bias source identification engine, based on results of the testing of the trained cognitive computing system, whether a source of the bias in the operation of the trained cognitive computing system is training of the trained cognitive computing system or bias present in the first corpus used by the trained cognitive computing system to generate the annotated output, based on results of the testing; and
  generating, by the bias source identification engine, an output indicating the source of the bias.

2. The method of claim 1, wherein testing the trained cognitive computing system using the bias test corpus and the set of bias test questions comprises:
  processing, by the trained cognitive computing system, one or more bias test questions in the set of bias test questions based on the bias test corpus; and
  determining, by the bias source identification engine, for each of the one or more bias test questions, whether a biased answer or a non-biased answer from the bias test corpus is returned as an answer by the trained cognitive computing system.

3. The method of claim 2, further comprising:
  determining, by the bias source identification engine, that the source of bias in the annotated output of the trained cognitive computing system is training of the trained cognitive computing system in response to a statistically significant higher number of instances of biased answers in the bias test corpus being returned by the trained cognitive computing system than non-biased answers in the bias test corpus being returned by the trained cognitive computing system as answers to the one or more bias test questions; and determining, by the bias source identification engine, that the source of bias in the annotated output of the trained cognitive computing system is the corpus used by the trained cognitive computing system in response to the number of instances of biased answers in the bias test corpus being returned by the trained cognitive computing system not being statistically significant over non-biased answers in the bias test corpus being returned by the trained cognitive computing system to the one or more bias test questions.

4. The method of claim 1, wherein the notification specifies an identifier of the source of the bias as being one of the training of the trained cognitive computing system or the corpus used by the trained cognitive computing system, based on the output from the bias source identification engine.

5. The method of claim 1, wherein processing the annotated input and the annotated output to determine whether the annotated input or annotated output comprises a portion of content that contains a bias trigger in the plurality of bias triggers further comprises:
  identifying annotated portions of the annotated input and the annotated output;
  analyzing corresponding contextual text surrounding the annotated portions to determine if the contextual text contains a bias trigger from the plurality of bias triggers; and
  adding a bias annotation to the annotated portions of the annotated input and the annotated output in response to corresponding contextual text surrounding the annotated portions containing a bias trigger from the plurality of bias triggers.

6. The method of claim 1, further comprising:
  tracking, by the bias identification engine, which operational parameters of the trained cognitive computing system contributed more highly than other operational parameters of the trained cognitive computing system, to annotated outputs of the trained cognitive computing system that are determined to have a bias trigger in the plurality of bias triggers;
  maintaining, by the bias identification engine, for each operational parameter of the operational parameters, a count of instances of the operational parameter contributing more highly than other operational parameters to the annotated outputs; and
  determining, for each operational parameter of the operational parameters, whether or not the operational parameter is biased based on an associated count.

7. The method of claim 6, wherein the notification comprises an indication of which operational parameters of the trained cognitive computing system are potentially biased based on results of determining, for each operational parameter, whether or not the operational parameter is biased based on the associated count.

8. The method of claim 1, wherein the annotated input is a version of an input received by the trained cognitive computing system that has been annotated by one or more annotators of the trained cognitive computing system, and wherein the output is a version of an output generated by the trained cognitive computing system that is annotated by the one or more annotators of the trained cognitive computing system, further comprising:
  modifying, by the bias identification engine, the output generated by the trained cognitive computing system to include an indicator that the output is potentially biased in response to results of the processing of the annotated input and the annotated output indicating that the annotated input or annotated output comprises a portion of content that contains a bias trigger in the plurality of bias triggers; and returning, by the trained cognitive computing system, to a source computing system that submitted the input to the trained cognitive computing system, the modified output.

9. A computer program product comprising a computer readable storage medium having a computer readable program stored therein, wherein the computer readable program, when executed on a computing device, causes the computing device to implement a bias identification engine that identifies bias in the operation of a trained cognitive computing system, the computer readable program causing the computing device to:

configure a bias risk annotator of the bias identification engine to identify a plurality of bias triggers in inputs to the trained cognitive computing system and outputs of the trained cognitive computing system based on a bias risk trigger data structure that specifies terms or phrases that are associated with a bias, wherein the trained cognitive computing system is an artificial intelligence computing system trained by a machine learning computer operation to generate the outputs based on the inputs to the trained cognitive computing system;

execute the trained cognitive computing system on an annotated input to the trained cognitive computing system and generate an annotated output, by the trained cognitive computing system, based on a first corpus of electronic content;

process, by the bias risk annotator, the annotated input and the annotated output to determine whether the annotated input or annotated output comprises a portion of content that contains a bias trigger in the plurality of bias triggers;

in response to at least one of the annotated input or annotated output comprising a portion of content containing a bias trigger in the plurality of bias triggers, transmit, by a bias notification engine of the bias identification engine, a notification to an administrator computing device, wherein the notification specifies the presence of bias in the operation of the trained cognitive computing system; and in response to at least one of the annotated input or the annotated output comprising a portion of content containing a bias trigger:

testing, by a bias source identification engine of the bias identification engine, the trained cognitive computing system using a set of bias test questions and a bias test corpus having a predetermined balance of biased results and unbiased results, to determine whether the trained cognitive computing system returns biased results from the bias test corpus at a higher amount than the trained cognitive computing system returns unbiased results from the bias test corpus;

determining, by the bias source identification engine, based on results of the testing of the trained cognitive computing system, whether a source of the bias in the operation of the trained cognitive computing system is training of the trained cognitive computing system or bias present in the first corpus used by the trained cognitive computing system to generate the annotated output, based on results of the testing; and generating, by the bias source identification engine, an output indicating the source of the bias.

10. The computer program product of claim 9, wherein testing the trained cognitive computing system using the bias test corpus and the set of bias test questions comprises:

processing, by the trained cognitive computing system, one or more bias test questions in the set of bias test questions based on the bias test corpus; and determining, by the bias source identification engine, for each of the one or more bias test questions, whether a biased answer or a non-biased answer from the bias test corpus is returned as an answer by the trained cognitive computing system.

11. The computer program product of claim 10, wherein the computer readable program further causes the computing device to:

determine, by the bias source identification engine, that the source of bias in the annotated output of the trained cognitive computing system is training of the trained cognitive computing system in response to a statistically significant higher number of instances of biased answers in the bias test corpus being returned by the trained cognitive computing system than non-biased answers in the bias test corpus being returned by the trained cognitive computing system as answers to the one or more bias test questions; and determine, by the bias source identification engine, that the source of bias in the annotated output of the trained cognitive computing system is the corpus used by the trained cognitive computing system in response to the number of instances of biased answers in the bias test corpus being returned by the trained cognitive computing system not being statistically significant over non-biased answers in the bias test corpus being returned by the trained cognitive computing system to the one or more bias test questions.

12. The computer program product of claim 9, wherein the notification specifies an identifier of the source of the bias as being one of the training of the trained cognitive computing system or the corpus used by the trained cognitive computing system, based on the output from the bias source identification engine.

13. The computer program product of claim 9, wherein processing the annotated input and the annotated output to determine whether the annotated input or annotated output comprises a portion of content that contains a bias trigger in the plurality of bias triggers further comprises:

identifying annotated portions of the annotated input and the annotated output;

analyzing corresponding contextual text surrounding the annotated portions to determine if the contextual text contains a bias trigger from the plurality of bias triggers; and adding a bias annotation to the annotated portions of the annotated input and the annotated output in response to corresponding contextual text surrounding the annotated portions containing a bias trigger from the plurality of bias triggers.

14. The computer program product of claim 9, wherein the computer readable program further causes the computing device to:

track, by the bias identification engine, which operational parameters of the trained cognitive computing system contributed more highly than other operational parameters of the trained cognitive computing system, to annotated outputs of the trained cognitive computing system that are determined to have a bias trigger in the plurality of bias triggers;

maintain, by the bias identification engine, for each operational parameter of the operational parameters, a count of instances of the operational parameter contributing more highly than other operational parameters to the annotated outputs; and determine, for each operational parameter of the operational parameters, whether or not the operational parameter is biased based on an associated count.

15. The computer program product of claim 14, wherein the notification comprises an indication of which operational parameters of the trained cognitive computing system are potentially biased based on results of determining, for each operational parameter, whether or not the operational parameter is biased based on the associated count.

16. The computer program product of claim 9, wherein the annotated input is a version of an input received by the trained cognitive computing system that has been annotated by one or more annotators of the trained cognitive computing system, and wherein the output is a version of an output generated by the trained cognitive computing system that is annotated by the one or more annotators of the trained cognitive computing system, wherein the computer readable program further causes the computing device to:

modify, by the bias identification engine, the output generated by the trained cognitive computing system to include an indicator that the output is potentially biased in response to results of the processing of the annotated input and the annotated output indicating that the annotated input or annotated output comprises a portion of content that contains a bias trigger in the plurality of bias triggers; and return, by the trained cognitive computing system, to a source computing system that submitted the input to the trained cognitive computing system, the modified output.

17. An apparatus comprising:

a processor; and a memory coupled to the processor, wherein the memory comprises instructions which, when executed by the processor, cause the processor to implement a bias identification engine that identifies bias in the operation of a trained cognitive computing system, the instructions causing the processor to:

configure a bias risk annotator of the bias identification engine to identify a plurality of bias triggers in inputs to the trained cognitive computing system and outputs of the trained cognitive computing system based on a bias risk trigger data structure that specifies terms or phrases that are associated with a bias, wherein the trained cognitive computing system is an artificial intelligence computing system trained by a machine learning computer operation to generate the outputs based on the inputs to the trained cognitive computing system;

execute the trained cognitive computing system on an annotated input to the trained cognitive computing system and generate an annotated output, by the trained cognitive computing system, based on a first corpus of electronic content;

process, by the bias risk annotator, the annotated input and the annotated output to determine whether the annotated input or annotated output comprises a portion of content that contains a bias trigger in the plurality of bias triggers; and in response to at least one of the annotated input or annotated output comprising a portion of content containing a bias trigger in the plurality of bias triggers, transmit, by a bias notification engine of the bias identification engine, a notification to an administrator computing device, wherein the notification specifies the presence of bias in the operation of the trained cognitive computing system; and in response to at least one of the annotated input or the annotated output comprising a portion of content containing a bias trigger:

testing, by a bias source identification engine of the bias identification engine, the trained cognitive computing system using a set of bias test questions and a bias test corpus having a predetermined balance of biased results and unbiased results, to determine whether the trained cognitive computing system returns biased results from the bias test corpus at a higher amount than the trained cognitive computing system returns unbiased results from the bias test corpus;

determining, by the bias source identification engine, based on results of the testing of the trained cognitive computing system, whether a source of the bias in the operation of the trained cognitive computing system is training of the trained cognitive computing system or bias present in the first corpus used by the trained cognitive computing system to generate the annotated output, based on results of the testing, and generating, by the bias source identification engine, an output indicating the source of the bias.

18. The method of claim 1, wherein processing the annotated input and the annotated output to determine whether the annotated input or annotated output comprises a portion of content that contains a bias trigger in the plurality of bias triggers comprises:

analyzing the annotated input and annotated input for first annotations that are not bias triggers but which have a first annotation type that is associated with a potential bias;

in response to finding a first annotation in a portion of the annotated input or annotated output, executing one or more bias annotator rules on a contextual textual content in proximity to a location associated with the first annotation to determine whether the contextual textual content comprises a bias trigger; and in response to conditions of at least one of the one or more bias annotator rules being satisfied by the contextual textual content comprising a bias trigger, associating annotations in a span of text in the portion as with a bias risk annotation specifying the span of text as being potentially biased, wherein the size of the span of text is specific to the particular at least one bias annotator rule whose conditions are satisfied by the contextual textual content.

19. The method of claim 18, wherein:

the one or more bias annotator rules are a subset of a plurality of bias annotator rules, the subset is specific to the first annotation type, different subsets of bias annotator rules are associated with different annotation types, and each bias annotation rule specifies a first annotation and a pattern of contextual textual content that, if matched, indicates a potential bias in the portion of contextual textual content.

20. The method of claim 7, wherein the operational parameters are weights of nodes in the trained cognitive computing system, and wherein the indication of which operational parameters of the trained cognitive computing system are potentially biased comprises a node id and a weight id that identifies the specific node and weight within the trained cognitive computing system where the potential bias is present.

21. The method of claim 4, wherein the identifier, in the notification, of the source of the bias comprises a listing of document identifiers of documents within the first corpus, and location identifiers within the corresponding documents, where the bias is determined to be present.

\* \* \* \* \*